(12) United States Patent
Jacobs, II

(10) Patent No.: US 11,176,730 B2
(45) Date of Patent: Nov. 16, 2021

(54) SYSTEMS FOR SECURE COLLABORATIVE GRAPHICAL DESIGN USING SECRET SHARING

(71) Applicant: Desprez, LLC, Nashua, NH (US)

(72) Inventor: James L Jacobs, II, Nashua, NH (US)

(73) Assignee: Desprez, LLC, Nashua, NH (US)

( * ) Notice: Subject to any disclaimer, the term of this patent is extended or adjusted under 35 U.S.C. 154(b) by 0 days.

(21) Appl. No.: 16/743,590

(22) Filed: Jan. 15, 2020

(65) Prior Publication Data

US 2020/0151941 A1     May 14, 2020

Related U.S. Application Data

(63) Continuation of application No. 15/936,965, filed on Mar. 27, 2018, now Pat. No. 10,573,059.

(51) Int. Cl.
| | |
|---|---|
| *G06T 15/00* | (2011.01) |
| *G06T 15/10* | (2011.01) |
| *G06F 21/64* | (2013.01) |
| *G06T 17/10* | (2006.01) |
| *G06T 19/20* | (2011.01) |

(52) U.S. Cl.
CPC ............ *G06T 15/10* (2013.01); *G06F 21/64* (2013.01); *G06T 17/10* (2013.01); *G06T 19/20* (2013.01); *G06T 2219/2021* (2013.01)

(58) Field of Classification Search
CPC . G06T 15/10; G06T 19/20; G06T 2219/2021; G06T 17/10; G06F 21/31; G06F 21/64; G06F 21/6227
USPC ......................................................... 345/418
See application file for complete search history.

(56) References Cited

U.S. PATENT DOCUMENTS

| | | | | |
|---|---|---|---|---|
| 5,790,435 | A * | 8/1998 | Lewis ................. | G06F 30/3312 716/102 |
| 6,415,430 | B1 * | 7/2002 | Ashar ..................... | G06F 30/34 716/105 |
| 7,623,139 | B1 * | 11/2009 | Gifford ................... | G06F 30/17 345/619 |
| 8,199,156 | B2 * | 6/2012 | Antoine ................ | G06F 3/1454 345/502 |
| 8,923,650 | B2 * | 12/2014 | Wexler ..................... | G06T 7/33 382/286 |
| 9,128,733 | B2 * | 9/2015 | Taron ....................... | G06F 9/451 |
| 9,842,397 | B2 * | 12/2017 | Wexler ................. | G06K 9/4633 |
| 10,346,999 | B2 * | 7/2019 | Wexler ..................... | G06T 7/62 |

(Continued)

OTHER PUBLICATIONS

Nieles M, Dempsey K, Pillitteri V. An introduction to information security. National Institute of Standards and Technology; Jan. 23, 2017.*

(Continued)

*Primary Examiner* — Phu K Nguyen
(74) *Attorney, Agent, or Firm* — Caldwell Intellectual Property Law, LLC

(57) ABSTRACT

Systems and methods are disclosed for secret sharing for secure collaborative graphical design. Graphical secret shares are generated from a three-dimensional graphical design and distributed to one or more contributor devices. Contributor graphical designs modifying graphical secret shares may be received from contributor devices. Various corresponding and related systems, methods, and software are described.

20 Claims, 12 Drawing Sheets

(56) References Cited

U.S. PATENT DOCUMENTS 10,573,059 B2 * 2/2020 Jacobs, II ............... G06T 17/10
10,733,116 B2 * 8/2020 Litichever ........... G06F 9/45504

OTHER PUBLICATIONS

Zaqaibeh B, Al Daoud E. The Constraints of Object-Oriented Databases. Int. J. Open Problems Compt. Math. Jun. 2008;1(1):2.*

Gennaro R, Halevi S, Krawczyk H, Rabin T, Reidt S, Wolthusen SD. Strongly-resilient and non-interactive hierarchical key-agreement in MANETs. InEuropean Symposium on Research in Computer Security Oct. 6, 2008 (pp. 49-65). Springer, Berlin, Heidelberg.*

Cabodi G, Camurati P, Garcia L, Murciano M, Nocco S, Quer S. Speeding up model checking by exploiting explicit and hidden verification constraints. In2009 Design, Automation & Test in Europe Conference & Exhibition Apr. 20, 2009 (pp. 1686-1691). IEEE.*

AutoCAD, Beyond the Basics: Working with Constraints in AutoCAD 2017 WEBINAR | AutoCAD, Jun. 2, 2016, https://www.youtube.com/watch?v=WtffTidlu7Y.*

* cited by examiner

SYSTEMS FOR SECURE COLLABORATIVE GRAPHICAL DESIGN USING SECRET SHARING

CROSS-REFERENCE TO RELATED APPLICATIONS

This application is a continuation of Non-provisional application Ser. No. 15/936,965 filed on Mar. 27, 2018 and entitled "SYSTEMS FOR SECURE COLLABORATIVE GRAPHICAL DESIGN USING SECRET SHARING," the entirety of which is incorporated herein by reference.

FIELD OF THE INVENTION

The present invention generally relates to the field of computer security. In particular, the present invention is directed to methods of secret-sharing for secure collaborative graphical design.

BACKGROUND

Collaborative design is an increasingly common practice in modern computer design and manufacture. As design challenges become more complex, a greater variety of specialized skills is required for success, often requiring the participation of several unrelated entities having the requisite skills. As a result, parties to a particular collaborative design process may be competitors in past or future endeavors. These potential competitors may be able to take advantage of designs, design processes, or manufacturing processes revealed to them in the course of a collaborative design session. This is particularly a concern where multiple competing contributions to the same collaborative design are being evaluated to maximize efficiency or minimize cost.

SUMMARY OF THE DISCLOSURE

In one aspect, a system for secret sharing for secure collaborative graphical design includes a secret owner device having at least a processor and a memory, the secret owner device designed and configured to provide, at the secret owner device, a first three-dimensional graphical design, wherein the first three-dimensional graphical design includes a first three-dimensional form including a first three-dimensional shape and a first dimension set in three dimensions and a plurality of features including at least a local geometric feature, generate at least a graphical secret share, wherein the graphical secret share is a graphical design that contains at least one feature of the first three-dimensional graphical design but lacks at least one other feature of the first three-dimensional graphical design, wherein generating the at least a graphical secret share further includes generating a second three-dimensional graphical form having a second three-dimensional shape and a second dimension set in three dimensions, wherein the second three-dimensional graphical form is distinct from the first three-dimensional graphical form, adding the at least a local geometric feature to the second three-dimensional graphical form, and generating the at least a graphical secret share as a function of the second three-dimensional graphical form and the at least a local geometric feature, and provide the at least a graphical secret share to at least a contributor device.

In another aspect, a method of secret sharing for secure collaborative graphical design includes providing, at a secret owner device having at least a processor and a memory, a first three-dimensional graphical design, wherein the first three-dimensional graphical design includes a first three-dimensional form including a first three-dimensional shape and a first dimension set in three dimensions and a plurality of features including at least a local geometric feature. The method includes generating, at the secret owner device, at least a graphical secret share. Generating the at least a graphical secret share includes generating a second three-dimensional graphical form having a second three-dimensional shape and a second dimension set in three dimensions, wherein the second three-dimensional graphical form is distinct from the first three-dimensional graphical form, adding the at least a local geometric feature to the second three-dimensional graphical form, and generating the at least a graphical secret share as a function of the second three-dimensional graphical form and the at least a local geometric feature. The three-dimensional graphical design contains at least a global constraint, and wherein generating the graphical secret share further comprises generating at least a secret share constraint as a function of the at least a global constraint. The method includes transmitting the at least a graphical secret share to at least a contributor device.

In another aspect, a non-transitory machine-readable storage medium containing machine-executable instructions for performing a method of secret sharing for secure collaborative graphical design that includes providing, at a secret owner device having at least a processor and a memory, a first three-dimensional graphical design, wherein the first three-dimensional graphical design includes a first three-dimensional form including a first three-dimensional shape and a first dimension set in three dimensions and a plurality of features including at least a local geometric feature, generating, at the secret owner device, at least a graphical secret share, wherein generating the at least a graphical secret share further includes generating a second three-dimensional graphical form having a second three-dimensional shape and a second dimension set in three dimensions, wherein the second three-dimensional graphical form is distinct from the first three-dimensional graphical form, adding the at least a local geometric feature to the second three-dimensional graphical form, and generating the at least a graphical secret share as a function of the second three-dimensional graphical form and the at least a local geometric feature, wherein the three-dimensional graphical design contains at least a global constraint, and wherein generating the graphical secret share further comprises generating at least a secret share constraint as a function of the at least a global constraint, and transmitting the at least a graphical secret share to at least a contributor device.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present invention include systems and methods that enable collaborative design to take place in a more secure fashion through the use of secret sharing. Graphical secret shares may be generated by a contributor device, automated manufacturing device, or other device, based on a three-dimensional graphical design to be modified by collaborative editing; each graphical secret share contains only a portion of the features of the three-dimensional graphical design. Modifications to graphical secret shares may be reincorporated in three-dimensional graphical design to produce a modified design. Secret share distribution and modification, as well as modifications to three-dimensional graphical design based on modifications to secret shares, may be performed in a centralized or decentralized architecture.

Figure 1:
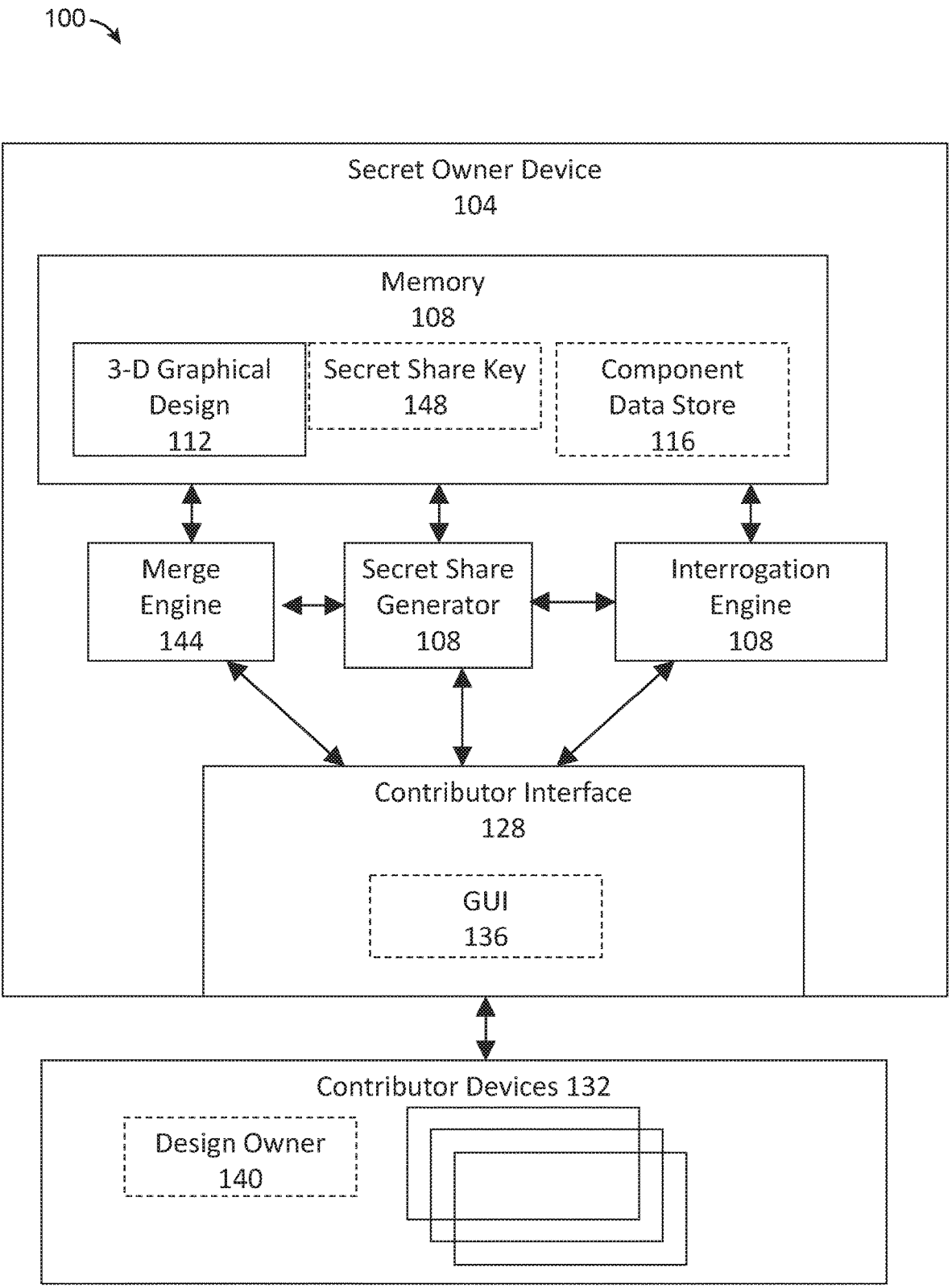
FIG. 1 is a block diagram illustrating an exemplary system for secure collaborative graphical design using secret sharing in an embodiment.

Referring to FIG. 1, an embodiment of a system 100 for secure collaborative graphical design using secret sharing is illustrated. The system includes a secret owner device 104. Secret owner device 104 may include any computing device as described below in connection with FIG. 10. Secret owner device 104 may include a plurality of computing devices as described below in connection with FIG. 10; for instance, secret owner device 104 may include a plurality of computing devices or processors working in parallel, or may balance tasks, modules, and/or components as described below between a plurality of devices according to any suitable method. Secret owner device 104 may be a single computing device.

Still viewing FIG. 1, system 100 includes a memory 108 operatively connected to a secret owner device 104. Memory 108 may include any memory technology suitable for storing information readable by computing devices, including secret owner device 104, in non-transitory form. Memory 108 may include, without limitation, any memory device or collection memory devices as described below in reference to FIG. 10, including without limitation a hard drive, a CD, a flash drive and/or cloud storage, among other known data storage devices/services. Memory 108 may organize data according to any suitable protocol for organization and storage of data on computing devices. Memory 108 may be operatively connected to secret owner device 104 where the secret owner device 104 is able to access the memory 104 to write or retrieve data, including graphical forms as described in further detail below.

Figure 2:
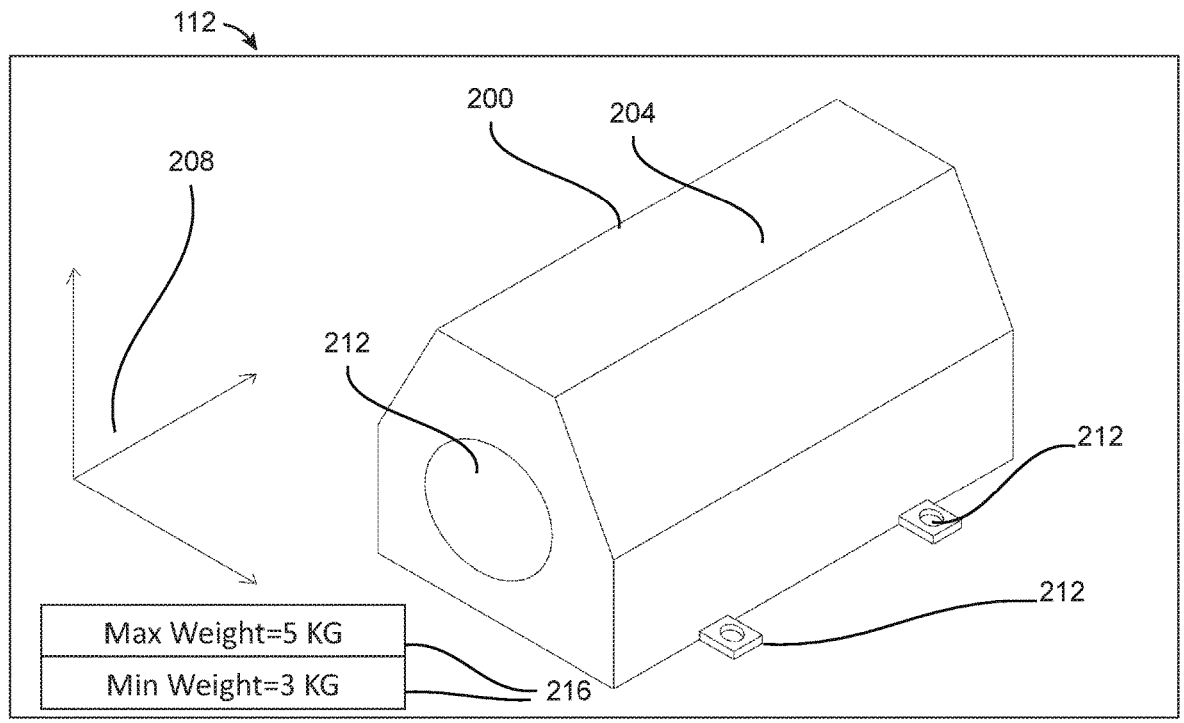
FIG. 2 is an isometric diagram illustrating an exemplary three-dimensional graphical design in an embodiment.

In an embodiment, and continuing to view FIG. 1, memory 108 may be designed and configured to store a three-dimensional graphical design 112. FIG. 2 illustrates an exemplary embodiment of a three-dimensional graphical design 112. Three-dimensional graphical design 112 includes a first three-dimensional form 200. First three-dimensional form 200 includes a first three-dimensional shape 204; first three-dimensional shape 204 may include any shape that may be illustrated in a finite three-dimensional space, including without limitation any regular or irregular polyhedral solids, solids with curved surfaces, or any combination thereof. First three-dimensional shape 204 may include any internal or external voids, cavities, or depressions. First three-dimensional shape 204 may include any projections from any surface or into any internal or external void, cavity, or depression; any internal or external void, cavity, or depression may be formed in any projection. First three-dimensional shape 204 may include any shape that may be produced in collaborative design methods as set forth in further detail below. First three-dimensional shape 204 may include any form suitable for depicting the shape of any existent object, or any designed object, including without limitation objects to be manufactured as described in further detail below. First three-dimensional shape 204 may include linear or quantized approximations of any three-dimensional shape, including fractal shapes. In an embodiment, geometric forms making up first three-dimensional shapes may be subjected to linear or other approximations for storage as pixels, voxels, or other digital storage means; geometric forms may alternatively be stored in the form of mathematical relationships or equations for geometric forms, which may be computed by reference to a dimension set as described below. Persons skilled in the art will be aware of various exact, iterative, or approximated mathematical expressions that may be used to characterize shapes in any set of dimensions, including without limitation in one-, two-, or three-dimensional spaces. Additional linear or digital approximations may be used to display first three-dimensional shape 204 on a display device, or for efficient transmittal of first three-dimensional shape 204 over any network.

Still viewing FIG. 2, first three-dimensional form 200 includes a first dimension set 208 in three dimensions. In an embodiment, first dimension set 208 is a numerical description of the size and scale of first three-dimensional form 200 and/or of any portion thereof. As a non-limiting example, first dimension set 208 may be a three-dimensional coordinate system, which may include any cartesian coordinate system or spherical, cylindrical, or other polar coordinate systems; coordinate system may be linearly, logarithmically, or otherwise scaled. More generally, first dimension set 208 may be any set of mathematical objects spanning three dimension over which a norm is defined indicating the distance between points or lines depicted in first three-dimensional form 200; in other words, first dimension set 208 provides an unambiguous means to measure or approximate any size of first three-dimensional form 200, including any linear distance between two points included in first three-dimensional form 200, any surface area shown on first three-dimensional form 200, and any volume depicted as part of first three-dimensional form. Persons skilled in the art will be aware of various methods for measurement or approximation of lengths, surface areas, and volumes with respect to any given first dimension set 208 as described herein.

Continuing to view FIG. 2, first three-dimensional form 200 includes at least a local geometric feature 212. At least a local geometric feature 212 may be any portion of first three-dimensional form 200 that is not the entire first three-dimensional form. At least a local geometric feature 212 may be a portion of first three-dimensional form to be modified in a collaborative design process as set forth in further detail below. At least a local geometric feature 212 may include without limitation a surface of first three-dimensional form 200, a portion of a surface of first three-dimensional form, a feature formed on or in a surface of first three-dimensional form 200 such as any projection, recess, hole, or combination thereof. At least a local geometric feature 212 may include without limitation any opening, cavity, or projection in first three-dimensional form 200. At least a local geometric feature 212 may include any three-dimensional section of first three-dimensional form 200.

Continuing to refer to FIG. 2, three-dimensional graphical design 112 may be created using a computer modeling program (not shown). Computer modeling program may create three-dimensional graphical design 112 automatedly by assembling one or more geometric forms. One or more geometric forms may include any forms suitable for the composition of first three-dimensional shape 204 including geometric primitives and/or models retrieved from memory 108 or received from remote device. One or more geometric forms may be assembled from particular related geometric forms according to one or more image-rending protocols including without limitation use of triangles to render images in a stereolithography (STL) file, use of raster or voxel-based graphics, or use of geometric relations governing vectors in vector image formats. Computer modeling program may retrieve previously created models and modify them to create three-dimensional graphical design 112; modifications may include combinations of two or more retrieved models, combinations of two or more models with additional details created using one or more geometric primitives, or by manipulation of rasters, vectors, voxels, pixels and the like. Computer modeling program may create three-dimensional graphical design 112 to match another computer model; for instance, computer modeling program may create three-dimensional graphical design 112 to fit a surface, cavity, or other feature of the other computer model. Computer modeling program may create three-dimensional graphical design 112 to fulfill a manufacturing requirement where the three-dimensional graphical design 112 represents a product or portion of a product to be manufactured, as discussed further below.

In an embodiment, and still referring to FIG. 2, computer modeling program may generate three-dimensional graphical design 112 in response to one or more user instructions. For instance, a user may enter an instruction directing computer model to create a geometric form of a given type or shape, with sides, surfaces, volumes, vertices, or other features spaced and sized according to a dimension set such as, but not limited to, first dimension set 208 as described above, and positioned in a particular location and/or attitude relative to any already extant forms in three-dimensional graphical design 112; as a non-limiting example, the user may select a particular kind of geometric form, and use a locator device such as a mouse, joystick, touchpad, or touchscreen to indicate positions within the three-dimensional graphical design 112 of vertices, sides, or points of a form, and computer modeling program may create a geometric form having the vertices, sides, or points as indicated. For instance, a user may create a rectangular face by selecting an option to create a rectangle, may use a mouse cursor to indicate two or more vertices of the rectangle; the computer modeling program may render a rectangle having the two or more vertices indicated. Persons skilled in the art will be aware of many potential means by which a computer modeling program may respond to a user instruction to create various geometric forms and spatial relationships therebetween to build a three-dimensional computer model. Computer modeling program may include without limitation a computer-assisted design (CAD) program, such as the SOLIDWORKS® CAD system (registered trademark of Dassault Systemes of Velizy Villacoublay, France).

In some embodiments, and still referring to FIG. 2, three-dimensional graphical form 112 represents a structure at some stage in a manufacturing process, such as an article to be manufactured; manufacture may be performed as guided by designs produced by system 100 as described herein, and three-dimensional graphical form 112 may represent a structure that is in an initial manufacturing stage, a partially completed or assembled product, a workpiece, or any other interim or final form of any article to be manufactured. Examples of a structure that may be represented by three-dimensional graphical form 112 include without limitation a piece of sheet metal, a solid cube, a cylindrical pipe, an injection molded plastic toy, an article of clothing such as a shirt made of cotton, and an assembly of various parts such as a vehicle, among others. Three-dimensional graphical form may be a CAD model of a part or an assembly of CAD models of parts that may be a virtual representation of a particular structure and may be created using one or more appropriate CAD programs.

As would be apparent to one reasonably skilled in the art, aspects and embodiments of the invention may be applied to any number of manufacturing types, including but not limited to additive manufacturing processes such as rapid prototyping, subtractive manufacturing processes such as machining, molding processes, and the manufacture of apparel and sheet metal products among others. In the case of sheet metal and apparel, designers may use CAD systems to design their products, using sheets of flat material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. In the case of additive processes, designers may choose particular additive processes to follow and materials to use according to similar considerations. Subtractive manufacturing processes may be designed or generated to remove material from one or more workpieces or blanks to produce forms modeled as described herein. Purchased components (in some cases, identical purchased components) may be added to the design, either in creating three-dimensional graphical form 112 or as part of the processes described below. CAD programs may be used to visualize the shape of the finished product, or of the product at any preliminary or intermediate manufacturing stage.

As used herein, a design document or design file is a file produced by a computer modeling program as described above. A design document may be or may include a CAD model, computer-model data, pricing data, non-pricing data, and/or a fabrication request, among other things. Designers may communicate such a design file while planning to one or more suppliers if they desire to place an order with the one or more suppliers.

Continuing to refer to FIG. 2, three-dimensional graphical design may contain at least a global constraint 216. At least a global constraint 216 may be one or more parameters limiting modifications to three-dimensional graphical design 112. At least a global constraint 216 may establish limits by reference to first dimension set 208. For instance, at least a global constraint 216 may include a requirement that three-dimensional graphical design 112 be larger or smaller than a certain volume as represented in first dimension set 208, or that the size of three-dimensional graphical design 112 be between a minimum volume and a maximum volume as represented in first dimension set 208. At least a global constraint 216 may place a limit on design complexity; as a non-limiting example, at least a global constraint 216 may include a limit to file size of a design to be produced by system using three-dimensional graphical design 112, or may include a limit to smallest theoretical file size to which a design produced by the system 100 using the three-dimensional graphical design 112 may be compressed in a lossless compression algorithm, for instance by reference to information entropy of the design. In some embodiments, limiting design complexity permits more efficient collaborative design processes by eliminating unnecessarily complex designs.

Still referring to FIG. 2, at least a global constraint 216 may impose a limit on an article to be manufactured as guided by a completed design produced by system 100 using three-dimensional graphical design 112. For instance, at least a global constraint 216 may include a maximum weight for a product produced according to the completed design. At least a global constraint may include a minimum weight for a product according to the completed design; for instance, a user creating three-dimensional graphical design 112 may be aware that a completed product the user intends to create will likely weigh more than some minimum amount, and may enter an instruction establishing that minimum weight as a global constraint to allow collaborators to design modifications accordingly as described in further detail below. At least a global constraint 216 may include a maximum tolerable degree of vibration, heat, impact or other factor affecting durability of completed product. At least a global constraint 216 may impose minimum degrees of vibration, heat, impact, or other factors affecting durability that completed product will likely have to withstand; for example, if completed product is likely to operate at high or low temperatures, components included in completed product may need to be able to function correctly at the high or low temperatures, or may need to have heat-dissipating or insulating properties to assemble to form a functioning completed product under expected conditions. At least a global constraint 216 may include a price-based; that is, there may be a maximum price that manufacture of completed product should not exceed. At least a global constraint 216 may place a limit on expected rate of depreciation of completed product. At least a global constraint 216 may place a minimum limit on durability, expected useful life, or other factors affecting the long-term usability and/or economic value of completed product.

At least a global constraint 216 may include a plurality of global constraints. For instance, at least a global constraint 216 may include a maximum weight completed product may not exceed and a minimum weight completed product will have. At least a global constraint 216 may include a relationship between two or more other global constraints; for instance, at least a global constraint 216 may include a constraint that maximizes present value of completed product according to a calculation relating manufacturing costs and projected maintenance costs of completed product, such that a highly durable product with a higher initial manufacturing cost may fulfill the global constraint, while a less-durable but more cheaply produced completed product may also fulfill the global constraint.

Memory 108 may include a component data store 116. Component data store 116 may be any structured data storage component, including without limitation databases such as relational databases, key-value data stores such as "NoSQL" data stores, data structures that facilitate efficient storage and/or lookup of data items, and the like. Component data store 116 may contain design files or models, such as those produced by computer modeling programs as described above, for various geometries, representations of components that may be assembled during manufacturing processes, and the like. For instance, and without limitation, component data store 116 may include design files representing one or more parts used in manufacture such as fasteners, brackets, motors, bearings, circuit elements, and the like.

Referring again to FIG. 1, system 100 includes an interrogation engine 120. Interrogation engine 120 may comprise, for example, a subprogram or program module that may interrogate a design file such as three-dimensional graphical design 112, secret shares as described in further detail below, contributor graphical designs as described in further detail below, or a combined graphical design as described below, to generate a list of objective requirements based on the data contained therein. Interrogation engine 120 may further interrogate design files to identify geometric forms, including without limitation first three-dimensional shape 204, local geometric feature 212, a second three-dimensional shape as described in further detail below, or a modification contained in a contributor graphical design or a combined graphical design, as described in further detail below.

Illustrative embodiments for an interrogation engine like interrogation engine 120 may be found in: U.S. patent application Ser. No. 15/467,079, filed on Mar. 23, 2017, and entitled "ELECTRONIC PRICING MACHINE CONFIGURED TO GENERATE PRICES BASED ON SUPPLIER WILLINGNESS AND A USER INTERFACE THEREFOR," which is incorporated by reference herein for its teachings of particular interrogation engines, extraction of information from interrogation engines, analysis of geometry in design files by interrogation engines, extraction of pricing data from computer models, and for generation of pricing for manufactured materials; U.S. patent application Ser. No. 14/060,033, filed on Oct. 22, 2013, and entitled "AUTOMATED FABRICATION PRICE QUOTING AND FABRICATION ORDERING FOR COMPUTER-MODELED STRUCTURES," which is incorporated by reference herein for its teachings of extracting pricing data from computer models and for generation of pricing for manufactured materials; U.S. patent application Ser. No. 14/282, 773, filed on May 20, 2014, and entitled "METHODS AND SOFTWARE FOR ENABLING CUSTOM PRICING IN AN ELECTRONIC COMMERCE SYSTEM," which is incorporated by reference herein for its teachings of particular interrogation engines and for generation of pricing for manufactured materials; and U.S. Patent Application Ser. No. 62/072,653, filed on Oct. 30, 2014, and titled "METHODS AND SOFTWARE FOR FACILITATING PRICING AND ORDERING OF A STRUCTURE REPRESENTED IN A COMPUTER MODEL," which is incorporated by reference herein for its teachings of various interrogation engines and related functionality and for generation of pricing for manufactured materials.

In some embodiments, an interrogation engine, such as interrogation engine 120, may parse and/or analyze a design file, which may be a CAD model, to identify separate elements thereof by reading a combination of (a) specific commands issued by a computer modeling program and (b) specific routines or functions associated with such commands to determine whether they collectively define an individual element or portion (a "shape," "solid body," or "component") of a design file. Many CAD systems, including, by way of example, the SOLIDWORKS® CAD system referred to above, include an application program interface (API) to enable a user to control the issuance of customized routines or functions associated with such commands. Interrogation engine 120 may read such commands, routines, and functions to determine whether they define an individual shape, and, if so, may analyze various geometric aspects of the defined shape to determine whether such aspects correspond to one or more manufacturing requirements for a product to be manufactured based on a CAD model; the interrogation engine 120 may analyze similar commands, routines, and functions of other computer modeling programs to determine whether such aspects correspond to one or more manufacturing requirements. If so, such requirements may be output from interrogation engine 120 as computer model data such as CAD data, interrogation data, and/or objective requirements data for processing and analysis by any one or more components of the present disclosure.

As a first step, interrogation engine 120 may identify discrete shapes in a design file. As a non-limiting example, in an embodiment based on the SOLIDWORKS® CAD system, interrogation engine 120 may read the "FeatureManager Design Tree" (an outline representation of individual shapes) to determine the number of solid bodies (or shapes) in the design; representations of individual shapes may be found in other CAD software files, and other CAD software systems may be used. In the SOLIDWORKS® CAD system, one command usable to analyze the number of solid bodies is:
object[ ] bodies=(object[ ])part.GetBodies2((int)Const.swBodyType_e.swSolidBody, false); {sans serif font}
and the output is a list of bodies. The foregoing code statement is listed by way of example only; other code statements or sequences could be used and may depend on the particular form in which the design file is created or formatted. For example, for a design file that defines surfaces, volumes, and other geometric forms using mathematical relationships interrogator engine 120 may analyze those mathematical relationships to derive geometric forms identified in the file. As another example, where one or more elements of the file are components retrieved from component datastore 116, such one or more elements may be identified by interrogator engine 120 by reference to component datastore 116, by reference to an identifier of the one or more elements associated with their identity in the component datastore 116, or to execution history indicating retrieval and inclusion of the one or more elements from the component datastore.

Interrogation engine 120 may then analyze geometric aspects of such identified shapes and compare such aspects to corresponding manufacturing requirements. In an embodiment, these manufacturing requirements may include given starting materials. In other words, interrogation engine 120 may determine whether a given defined shape can be manufactured from a given starting material based on one or more analyzed geometric properties of one or more identified shapes. If so, that starting material may be identified as a manufacturing option or requirement and may be included in computer modeling program data, such as CAD data, generated by interrogation engine 120. Interrogation engine 120 may identify a manufacturing method that is usable to manufacture a given defined shape from a given starting material. For instance, interrogation engine 120 may determine whether a sheet metal starting material is of sufficiently uniform thickness to produce a sheet metal part. As another example, interrogation engine 120 may determine whether a particular starting material is of sufficient softness for a given machining process, or possesses some other required property, such as conductivity for electronic discharge machining (EDM). Interrogation engine 120 may determine whether a final material property described in a design file is achievable using a given manufacturing method, or a given starting material; for instance, a needed degree of strength or tolerance in a finished part may require a subtractive manufacturing process, while internal voids for lightness or buoyancy may require a process that is not subtractive.

Interrogation engine 120 may be designed and configured to extract the at least a local geometric feature from the three-dimensional graphical design. Interrogation engine 120 may do this automatically by identifying geometric forms and outputting computer modeling program files containing the identified forms. A user may enter one or more instructions identifying one or more geometric forms as local geometric features; for instance, the user may select the one or more forms with a mouse or other locator device. The identification and extraction of at least a local geometric feature 212 may be performed with using a combination of user selection and automated processes; for instance, interrogation engine 120 may identify one or more forms selected by a user by means of geometric analysis, as described above.

Interrogation engine 120 may be configured to determine a price for manufacture of a product represented in a design file. In addition to the matters incorporated by reference above, illustrative embodiments for the use of an interrogation engine such as interrogation engine 120 to extract information for pricing from a design file, and the use of such information to generate pricing for manufacture of an article represented in the design file, may be found in U.S. patent application Ser. No. 14/928,001, filed on Oct. 30, 2015, and entitled "METHODS AND SOFTWARE FOR A PRICING-METHOD-AGNOSTIC ECOMMERCE MARKETPLACE FOR MANUFACTURING SERVICES," the entirety of which is incorporated herein by reference. A price may be a price estimate, a bid, or a firm fixed quote, and may contain non cost information such as a specific or range of lead-time or delivery date(s), among others. Interrogation engine 120 may evaluate the price of the overall design, as well as the prices of individually contributed components; rules for interrogation engine may place non-price constraints on secret shares based on a known effect of, for instance, a particular geometric form or other thing on the overall price, as maintained in component data store 116 or other location in memory, or as received from a contributor device.

Interrogation engine 120 may be configured to evaluate conformance of a design used or produced by system 100 to one or more constraints, such as at least a global constraint 216 or a secret share constraint as described in further detail below. For instance, where a global constraint of at least a global constraint 216 is a constraint on a size, volume, or other dimensional characteristic of a structure represented in a design file, interrogation engine 120 may use identified geometric features and a dimension set such as first dimension set 208 to obtain the dimensional characteristic subject to the constraint, and compare the dimensional characteristic to the constraint. As another example, where at least a global constraint 216 imposes a maximum or minimum limit on the mass or weight of the structure represented in the design file, interrogation engine 120 may use computation of volume of one or more identified geometric forms in combination with material data concerning one or more materials composing the structure as represented in the design file to compute the mass or weight of the structure. Material data may similarly be used to determine whether the structure has requisite material properties such as resistance to heat, vibration, or impact damage, heat or electrical conductivity, or other properties specified by a global constraint or secret share constraint. The effect of a particular modification on a global constraint may also be provided by a contributor device to interrogation engine 120 or retrieved from component data store 116 or other locations in memory 108.

Still referring to FIG. 1, system 100 includes a secret share generator 124 operating on the secret owner device 104. Secret share generator 124 may comprise, for example, a subprogram or program module designed and configured to generate at least a graphical secret share. Referring now to FIGS. 3A-D, a secret share of at least a graphical secret share 300 as used herein is a graphical design, which may be any graphical design as described above regarding three-dimensional graphic design 112, which contains at least one feature of the three-dimensional graphical design but lacks at least one other feature of the three-dimensional graphical design 112; as a result, possession of one secret share of at least a secret share 300 provides the possessor with insufficient information to reconstruct three-dimensional graphic design.

Figure 3A:
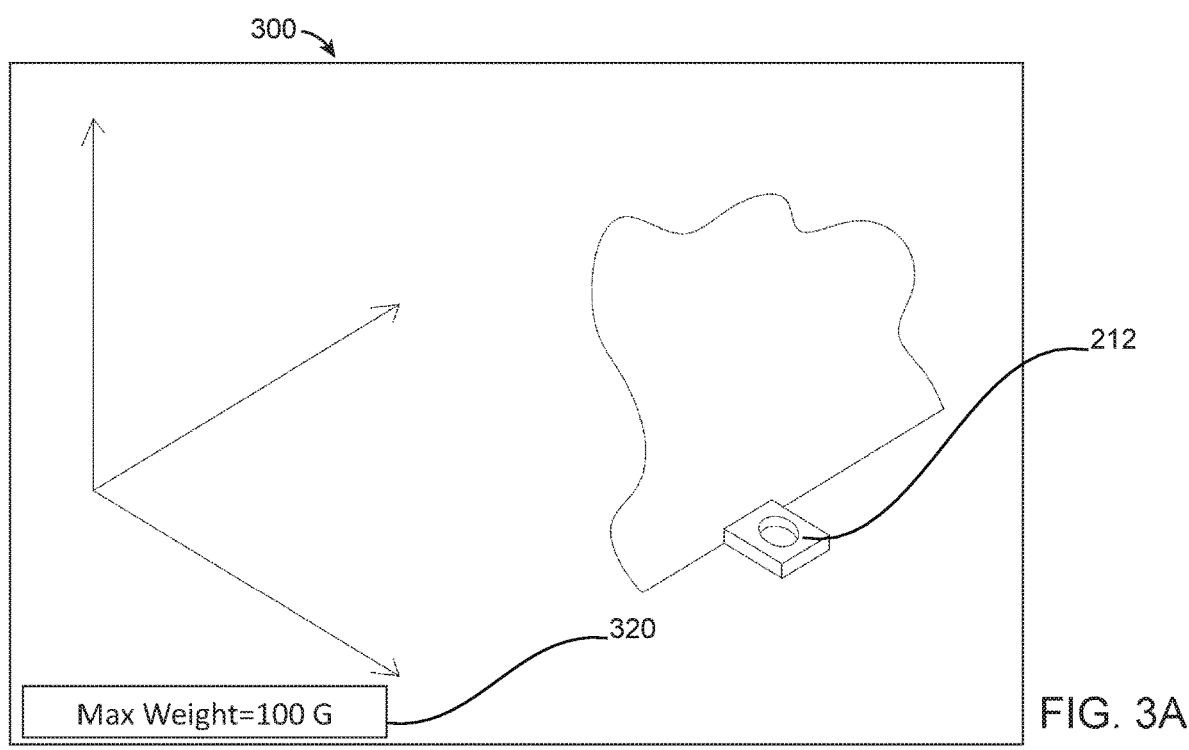
FIG. 3A is an isometric diagram illustrating an exemplary graphical secret share in an embodiment.
Figure 3B:
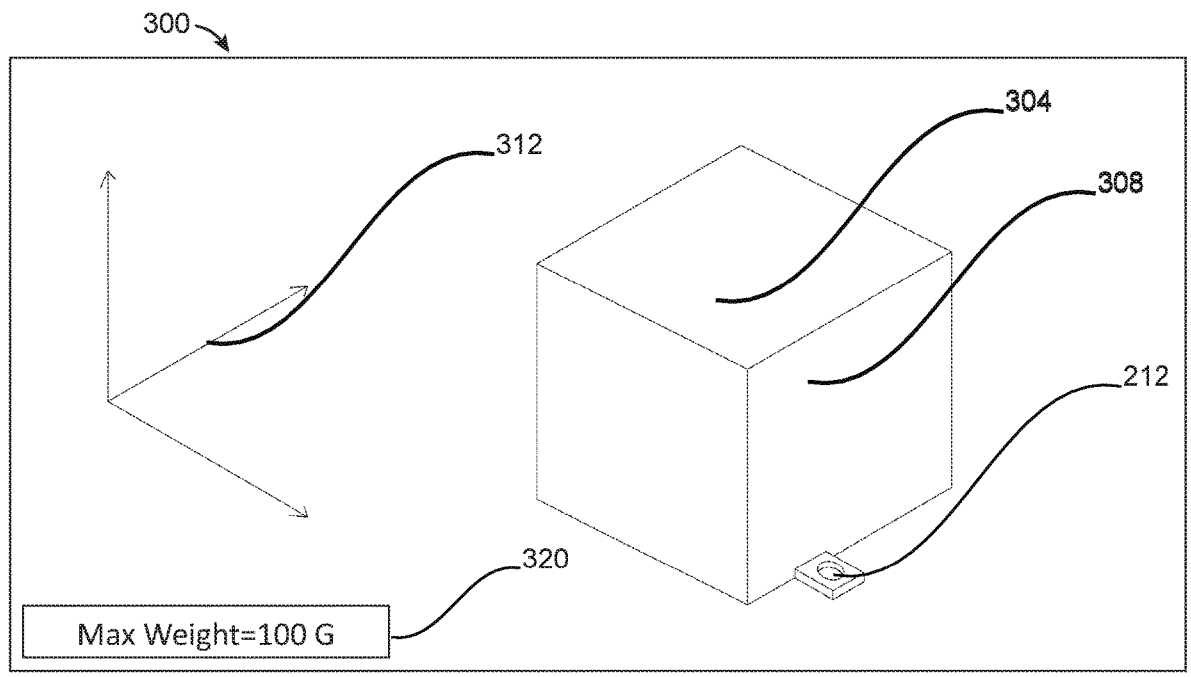
FIG. 3B is an isometric diagram illustrating an exemplary graphical secret share in an embodiment.
Figure 3C:
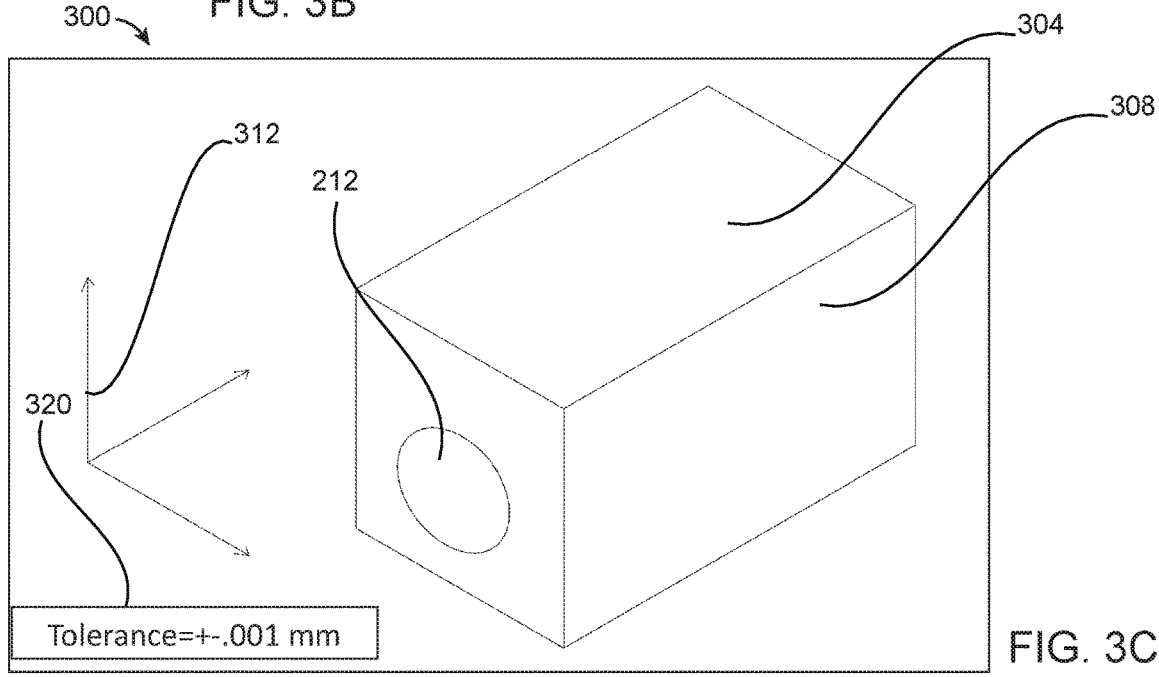
FIG. 3C is an isometric diagram illustrating an exemplary graphical secret share in an embodiment.

Still referring to FIGS. 3A-D, at least a secret share 300 may include the at least a local geometric feature 212. In some embodiments, for example as shown in FIG. 3A, at least a graphical secret share contains only the at least a local geometric feature 212. Graphical secret share may contain a restricted set of local geometric features of at least a local geometric feature 212; for instance, where a first local geometric feature of at least a local geometric feature 212 requires a first modification to advance the design to be produced by system 100 and a second local geometric feature of the at least a local geometric feature 212 requires a second modification, and where the first modification is different from the second modification, only the first local geometric feature of at least a local geometric feature 212 may be included in a first secret share of the at least a graphical secret share 300, while the second local geometric feature may be included in a second secret share of the at least a graphical secret share. For example, where the three-dimensional graphic design 112 includes a first local geometric feature that requires the addition of a fastener, and a second local geometric feature that requires the production of a through-hole through a portion of the structure represented in the three-dimensional graphic design 112, a first secret share of at least a graphical secret share 300 may include the first local geometric feature, for instance as shown in FIGS. 3A-B, and a second secret share of the at least a graphical secret share 300 may include the second geometric feature, for instance as shown in FIG. 3C.

Still referring to FIGS. 3A-D, here three-dimensional graphic design 112 includes a plurality of duplicative local geometric features of at least a local geometric feature 212, a secret share of at least a graphical secret share 300 may include only one of the plurality of duplicative local geometric features. As a non-limiting example, where three-dimensional graphic design 112 includes multiple identical holes for fasteners, only one hole for a fastener may be included in a secret share of at least a graphical secret share 300.

Figure 3D:
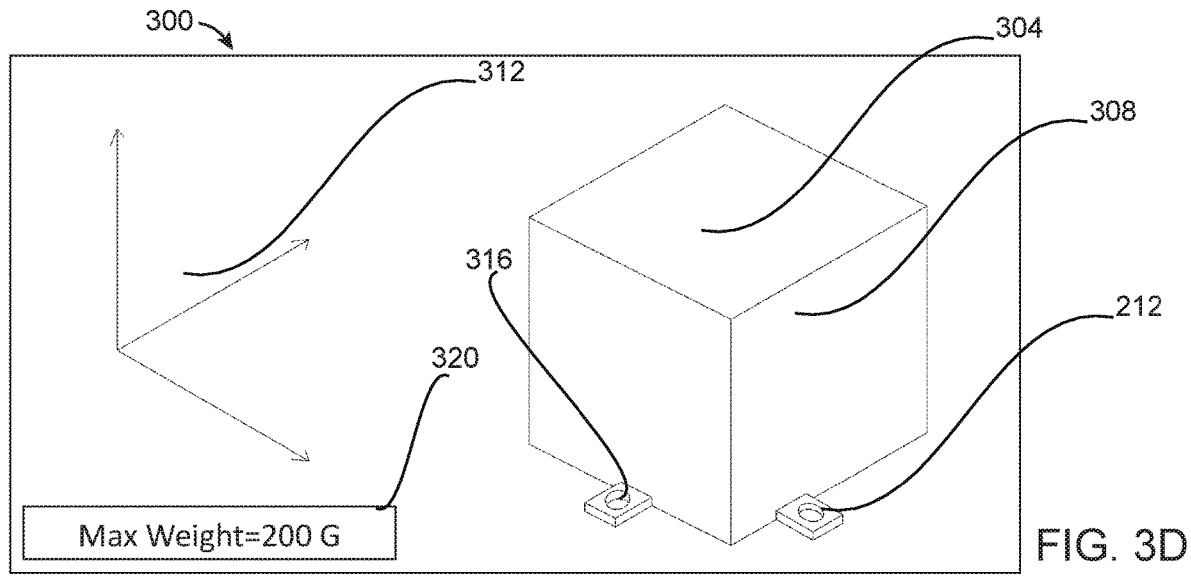
FIG. 3D is an isometric diagram illustrating an exemplary graphical secret share in an embodiment.

As shown for instance in FIGS. 3B-D, a secret share of at least a graphical secret share 300 may include a second three-dimensional graphical form 304 having a second three-dimensional shape 308 and a second dimension set 312 in three dimensions. Second three-dimensional graphical form 304 may be any three-dimensional form suitable for use as first three-dimensional form 200. Second three-dimensional shape 308 may be any shape or combination of shapes suitable for use as first three-dimensional shape 204 as described above; second three-dimensional shape 308 may be stored, represented, or rendered according to any method suitable for storage, representation, or rendering of first three-dimensional shape. Second dimension set 312 may be anything useable for first dimension set 208 as described above.

Still viewing FIGS. 3B-D, second three-dimensional graphical form 304 may be distinct from the first three-dimensional graphical form 200. For instance, second geometric shape 308 may be a different shape from first three-dimensional shape 204. Second dimension set 312 may be different from first dimension set 208. In some embodiments, second three-dimensional graphical form 304 is created with a plurality of shape and dimensional differences from first three-dimensional graphical form 200, for instance as described in further detail below.

As shown for instance in FIG. 3D, at least a graphical secret share 300 may include one or more dummy features 316. One or more dummy features 316, as used herein, are one or more local geometric features that are not a part of three-dimensional graphic design 112. One or more dummy features 316 may include duplicates of a local geometric feature of at least a local geometric feature 212 that is included in a particular secret share. One or more dummy features 316 may include other components selected from component data store 116. The number of dummy features included in a secret share of the at least a secret share may be created as a function of a number of distinct features of three-dimensional graphical design 112, as described in further detail below. The number of distinct dummy features included in a secret share of the at least a secret share may be created as a function of a number of distinct features of three-dimensional graphical design 112, as described in further detail below.

In an embodiment, a secret share of at least a graphical secret share 300 enables system to provide a feature to be modified to a collaborator device as described below, in a manner that permits collaborator device to provide one or more options for the desired modification without permitting collaborator device or an operator of collaborator device to derive the overall design of three-dimensional graphical design 112 or of any other computer model or graphical design produced by system 100 using the desired modification. In an embodiment, the use of dummy features 316 may render it difficult or impossible to assemble two or more secret shares of at least a secret share 300 to derive three-dimensional graphical design 112 or other designs or computer models produced by system 100; this may particularly be the case where system 100 is collaboratively designing several distinct designs from several three-dimensional graphical designs 112 simultaneously. As a result, it may be possible to obtain several distinct modifications to one three-dimensional graphical design 112 from the same collaborator device using multiple secret shares without enabling that collaborator device or its operator to reconstruct three-dimensional graphical design 112 from the secret shares.

Referring to FIGS. 3A-D, secret share generator 124 may be designed and configured generate at least a secret share constraint 320 as a function of at least a global constraint 216. At least a secret share constraint 320 may be any constraint usable for at least a global constraint 216, as applied to at least a graphical secret share 300; that is, at least a secret share constraint may be one or more parameters limiting modifications to a secret share of at least a graphical secret share.

Continuing to refer to FIGS. 3A-D may be performed by a numerical calculation using at least a global constraint 216 as described in further detail below. At least a numerical calculation may be performed using one or more mathematical relations stored in memory 108. At least a numerical calculation may be performed using information provided by interrogation engine 120; interrogation engine 120 may provide information extracted from three-dimensional graphical design 112. Interrogation engine 120 may provide information extracted from at least a graphical secret share 300. At least a numerical calculation may be performed using one or more properties of a structure represented in three-dimensional graphical design 112, such as material or materials from which the structure is to be formed; where the one or more properties are embedded in three-dimensional graphical design, interrogation engine 120 may provide the one or more properties. At least a numerical calculation may be performed using one or more manufacturing goals associated with three-dimensional graphical design 112; one or more manufacturing goals may be provided in the three-dimensional graphical design 112 and retrieved by interrogation engine 120 or may be stored in and retrieved from elsewhere in memory 108. At least a numerical calculation may be performed using one or more properties or manufacturing goals of at least a secret share 300.

Still referring to FIGS. 3A-D, at least a secret share constraint may be embedded in at least a secret share 300, and thus conveyed with at least a secret share 300 to a contributor device as described below. At least a secret share constraint may be provided with at least a secret share 300; that is at least a secret share constraint may be provided to a contributor device to which a corresponding secret share of the at least a secret share 300 is transmitted, as described in further detail below.

Still viewing FIGS. 3A-D, in an embodiment, secret share generator 124 may be designed and configured to modify at least a secret share constraint 320. For example, secret share generator 124 may modify a secret share constraint of at least a secret share constraint 320 in response to evaluation of modifications to at least a secret share 300, as described in further detail below. As a non-limiting example, secret share generator 124 may modify at least a secret share constraint 320 by producing a new secret share constraint as a function of the at least a secret share constraint and adopting the new secret share constraint as at least a part of at least a secret share constraint.

Reviewing FIG. 1 again, system 100 includes a contributor interface 128. Contributor interface performs electronic communication with one or more contributor devices 132. Each contributor device of at least a contributor device 132 may be any computing device or combination of computing devices suitable for use as secret owner device 104. In an embodiment, at least a contributor device 132 exchanges graphical secret shares, such as at least a graphical secret share 300 and other graphical files with secret share owner 104, for example by way of contributor interface, 128 for the purposes of secure collaborative design of a three-dimensional form based upon three-dimensional graphical design 112.

Still viewing FIG. 1, contributor interface 118 is designed and configured to transmit at least a graphical secret share 300 to at least a contributor device 132. Contributor interface 128 may transmit at least a secret share 300 to at least a contributor device 132 using any medium of electronic communication, including without limitation wired electronic communication, wireless communication, and fiber optics. Contributor interface 128 may transmit at least a secret share 300 using any analog or digital data transfer protocol, including packet-based communication, communication performed by modulating a signal, and the like. Non-limiting examples of digital data transfer protocols usable by contributor interface 128 may include file transfer protocol (FTP), hypertext transfer protocol (HTTP), any streaming protocols, and any new generation or secure versions of any protocol.

Continuing to view FIG. 1, at least a contributor device 132 may use computer modeling programs, such as CAD programs, operating on the at least a contributor device 132 to modify at least a graphical secret share 300. For instance, at least a contributor device 132 may receive at least a graphical secret share 300 in any data format and translate to any data format suitable for modification or manipulation in a computer modeling program operating on at least a contributor device 132, perform modifications, and then return at least a graphical secret share 300, as modified, as described in further detail below. Persons skilled in the art will be aware that at least a graphical secret share 300 and other graphical files may be transmitted, received, and/or stored in formats readable by various different computer modeling programs, including without limitation standardized file formats. In some embodiments, one or more computer modeling programs operating on at least a contributor device 132 make changes automatedly based upon at least a graphical secret share 300; for instance, at least a secret share 300 may provide sufficient information to permit a modeling program to determine a needed modification and to perform the needed modification on the at least a secret share 300, as described in further detail below.

Still viewing FIG. 1, contributor interface 128 may provide a graphical user interface (GUI) 136. GUI 136 may cause at least a graphical secret share 300 to display on at least a contributor device 132, for instance by means of a web browser or client-side application downloaded to the at least a contributor device 132. GUI 136 may provide one or more tools that permit a user to modify at least a graphical secret share 300; one or more tools may include any tools available for editing any file in any computer modeling program, which may include without limitation tools permitting the user to modify displayed geometry. Tools for editing may include tools to permit the user to load component information into the at least a graphical secret share 300, for instance by retrieving geometrical, material, and/or other information describing a component from a file or data store on contributor device 132. GUI 136 may similarly provide access to data describing one or more components or geometries that may be added from, for instance, component data store 116 or similar data stores; access to contents of component data store 116 may be managed by access control technologies and methods as set forth in further detail below. GUI 136 may provide user with one or more tools to view at least a graphical secret share 300 with or without modifications, including without limitation tools to rotate, zoom, view textual annotations, display perspective, isometric, or straightaway views, or any other display or display modification options available in any computer modeling program.

GUI 136 may include a spectrum viewer (not shown) that enables a user to add or remove tools for viewing or modifying files such as at least a graphical secret share 300. Illustrative embodiments for a GUI, a spectrum viewer, and other user interfaces provided over a network may be found in U.S. patent application Ser. No. 14/229,008, filed on Mar. 28, 20174, and entitled "METHODS AND SOFTWARE FOR REQUESTING A PRICING IN AN ELECTRONIC MARKETPLACE USING A USER-MODIFIABLE SPECTRUM INTERFACE," which is incorporated by reference herein in its entirety.

System 100 may communicate with a design owner device 140. Design owner device 140 may be a device from which system 100 receives an instruction to perform collaborative graphical design as disclosed herein; the design owner device 140 may be a device operated by a user or entity having a proprietary interest in the design to be produced by the collaborative graphical design system 100. Design owner device 140 may be included in secret owner device 104; for instance, the secret owner device 104 may be operated by the same entity having a proprietary interest in the design produced by collaborative graphical design system 100. Design owner device 140 may be a remote device; design owner device 140 may be any device suitable for use as at least a contributor device 132. Design owner device 140 may function as a contributor device for a different design in which a different entity has a proprietary interest. Design owner device 140 may communicate with secret owner device 104 by way of contributor interface 128 or a similar interface (not shown); contributor interface 128 may interact with design owner device using any technology or method useable to interact with at least a contributor device 132.

Figure 4A:
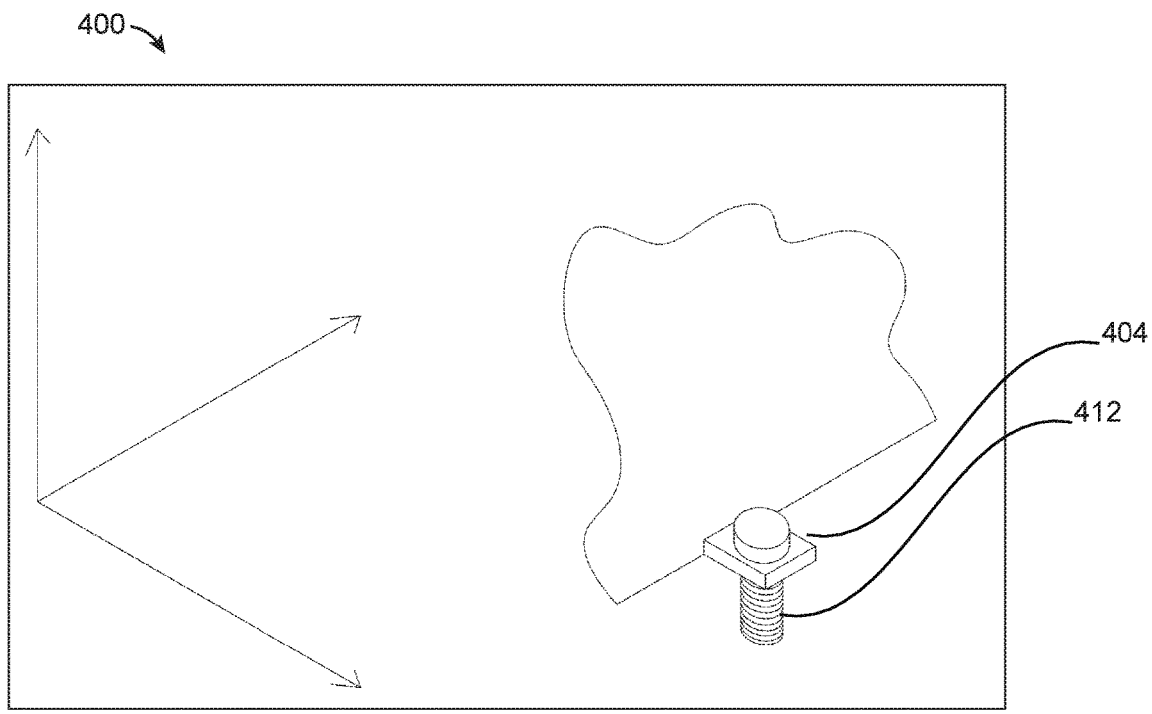
FIG. 4A is an isometric diagram illustrating an exemplary contributor graphical design in an embodiment.
Figure 4B:
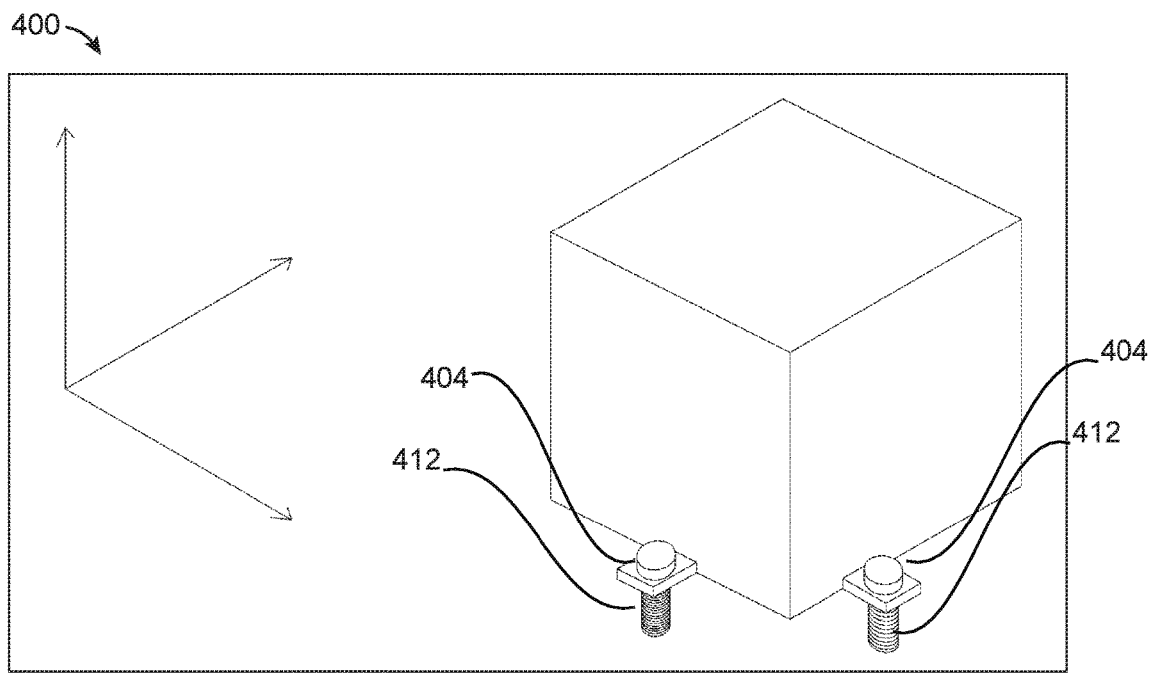
FIG. 4B is an isometric diagram illustrating an exemplary contributor graphical design in an embodiment.
Figure 4C:
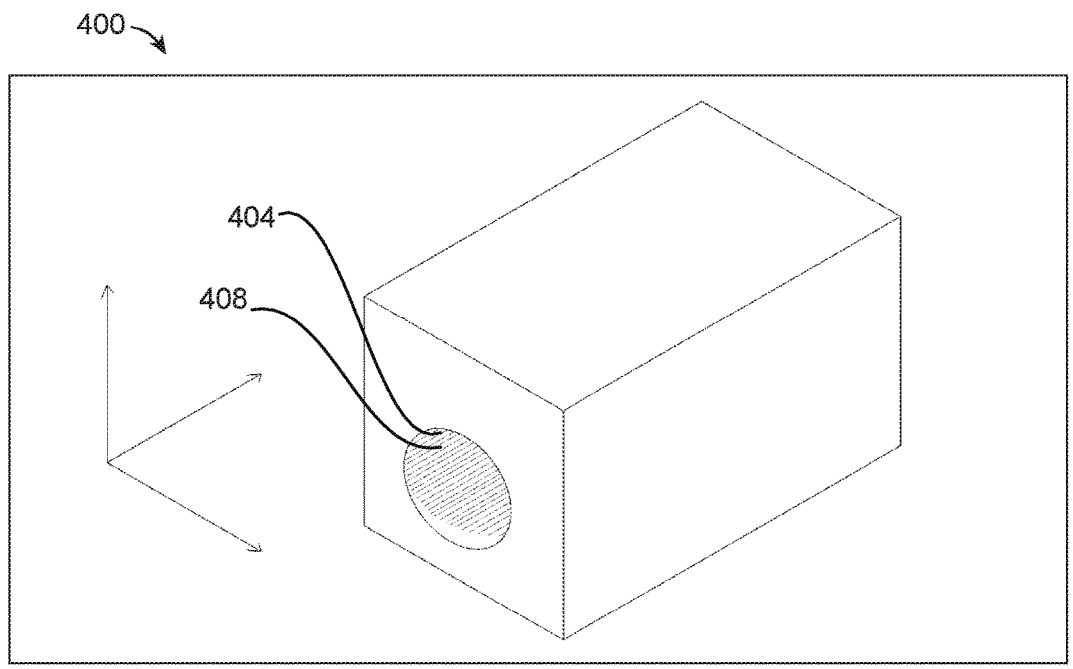
FIG. 4C is an isometric diagram illustrating an exemplary contributor graphical design in an embodiment.

Contributor interface 128 may be designed and configured to receive from at least a contributor device 132 at least a contributor graphical design 400, exemplary embodiments of which are illustrated in FIGS. 4A-B. At least a contributor graphical design 400 may include at least a modification 404 to at least a local geometric feature as included in at least a graphical secret share 300; at least a modification may include an alteration of geometry 408 of the at least a local geometric feature, which may be any alteration of geometry that may be performed by any computer modeling program. At least a modification 404 may include an addition of a component 412 to at least a local geometric feature. Where at least a graphical secret share 300 includes one or more dummy features 316, at least a modification may include modification to one or more dummy features 316 as well as to at least a local geometric feature; at least a contributor device 132 may have no way of determining which feature in at least a secret share 300 is at least a local geometric feature, and which is at least a dummy feature 316. Where at least a secret share 300 includes second three-dimensional graphical form 304, contributor graphical design may include modifications to second three-dimensional graphical form 304; contributor device 132, or a user or entity operating contributor device 132, may have no way of knowing which portions of at least a graphical secret share 300 are at least a local geometric feature 212 and which portions are the second three-dimensional graphical form.

Figure 5:
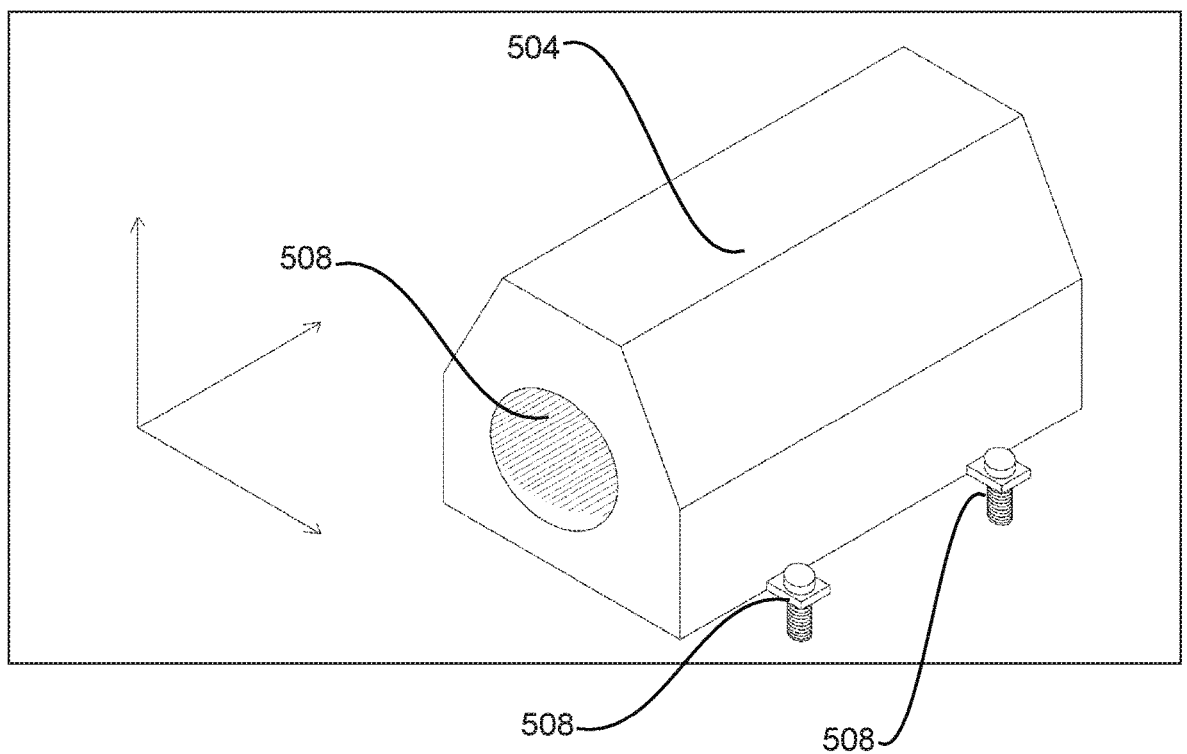
FIG. 5 is an isometric diagram illustrating an exemplary combined three-dimensional graphical design in an embodiment.

Referring FIG. 1 again, system 100 may include a merge engine 144 executing on secret owner device 104. Merge engine 144 may be implemented in any suitable fashion, including as a software module executing on secret owner device 104, a hardware module coupled to secret owner device, a dedicated computing device, and the like. In an embodiment, merge engine 144 is designed and configured to generate at least a combined graphical design as a function of the three-dimensional graphical design and the at least a contributor graphical design. FIG. 5 illustrates an exemplary embodiment of a combined graphical design 500. Combined graphical design 500 may include a combined graphical design three-dimensional form 504 created as a function of first three-dimensional form 200. Combined graphical three-dimensional form 504 may be created as a function of first three-dimensional form 200 if the combined graphical three-dimensional form 504 has one or more geometric features matching the first three-dimensional form 200; for instance, merge engine may produce the combined graphical three-dimensional form 504 by applying modifications from contributor graphical design to the first three-dimensional form 200.

Continuing to view FIG. 5, combined graphical design 500 may include at least a combined graphical local feature 508. Combined local feature 508 may be created as a function of at least a local geometric feature 212 and at least a modification 404; in other words, combined local feature 508 may include at least a local geometric feature 212 as modified by at least a modification 404. For instance, where at least a modification 404 includes at least a modification to geometry 408, combined local feature 508 may include at least a local geometric feature as modified by at least a modification to geometry 512. Where at least a modification 404 includes at least a component 412, combined local feature 508 may include at least a local geometric feature with added at least a component 516.

As noted above, and still viewing FIG. 5, interrogation engine 120 may be designed and configured to test feasibility of combined graphical design 500, as set forth in further detail below. Merge engine 144 may be designed and configured to receive an indication from interrogation engine 120 that one or more elements of combined graphical design 500 are infeasible. Merge engine 144 may be designed and configured to receive a user input indicating that one or more elements of combined graphical design 500 are infeasible. Merge engine 144 may be designed and configured to transmit to at least a contributor device 132 an indication that at least a graphical secret share 300 contains an infeasible modification. Further examples of methods for the detection of infeasibility and transmission of indication that at least a graphical secret share 300 contains an infeasible modification are described below.

Referring again to FIG. 1, secret owner device 104 may store a secret share key 148. Secret share key 148 may be a datum such as a number or array of numbers that indicates how to combine at least a secret share to produce the design being developed. Secret share key 148 may include a file identifier identifying three-dimensional graphical design; as a result, possessors of at least a graphical secret share 300 may be able to determine between them how to combine at least a graphical secret share 300, including any modifications performed by at least a contributor device. In an embodiment, secret share key 148 may record which features of an enumeration of features across all secret shares of at least a graphical secret share 300 are genuine features of the design being developed and which are dummy features. Secret owner device 148 may store secret share key 148 in memory 108. As a non-limiting example, secret share key 148 be a data structure mirroring a data structure of geometric features, such as a tree of features maintained by some CAD programs, with values such as binary values used to encode whether a given feature is included or not (for instance, a binary value of "1" indicating the feature is included and a binary value of "0" indicating it is not). Secret share key 148 may be generated by secret share generator 124 as described in further detail below. In an embodiment, merge engine 144 may be designed and configured to use secret share key 148 to determine which features to from at least a contributor graphical design 400 to combine to form combined three-dimensional graphical design 500. Secret share generator 124 may be designed and configured to generate one or more key shares from secret share key, as described in further detail below.

Although the above description, as illustrated in FIG. 1, has treated interrogator 120, secret share generator 124, contributor interface 128, and merge engine 144 as separate modules, persons skilled in the art will be aware that any or all such elements may be combined in one or more circuits, data structures, sets of processes, or other combinations or divisions as efficiency and ease of design may indicate. Moreover, system 100 may include one or more additional modules or functionality that may interact with interrogator 120, secret share generator 124, contributor interface 128, and/or merge engine 144, as well as with contributor devices 132 and/or design owner device or devices 140; such modules may include without limitation ordering modules (not shown) for automatedly ordering processes or components from contributor devices 132, operators of contributor devices 132, or other entities, contributor capabilities database or data stores (not shown), contributor pricing databases or data stores (not shown), or any other modules or components that may be used in conjunction with computer modeling programs, collective design programs or platforms, cryptographic or secret-sharing programs or devices, and the like. System 100 may include any module or component described in the applications incorporated by reference above. System 100 may include any component of a manufacturing system as described in further detail below.

Figure 6:
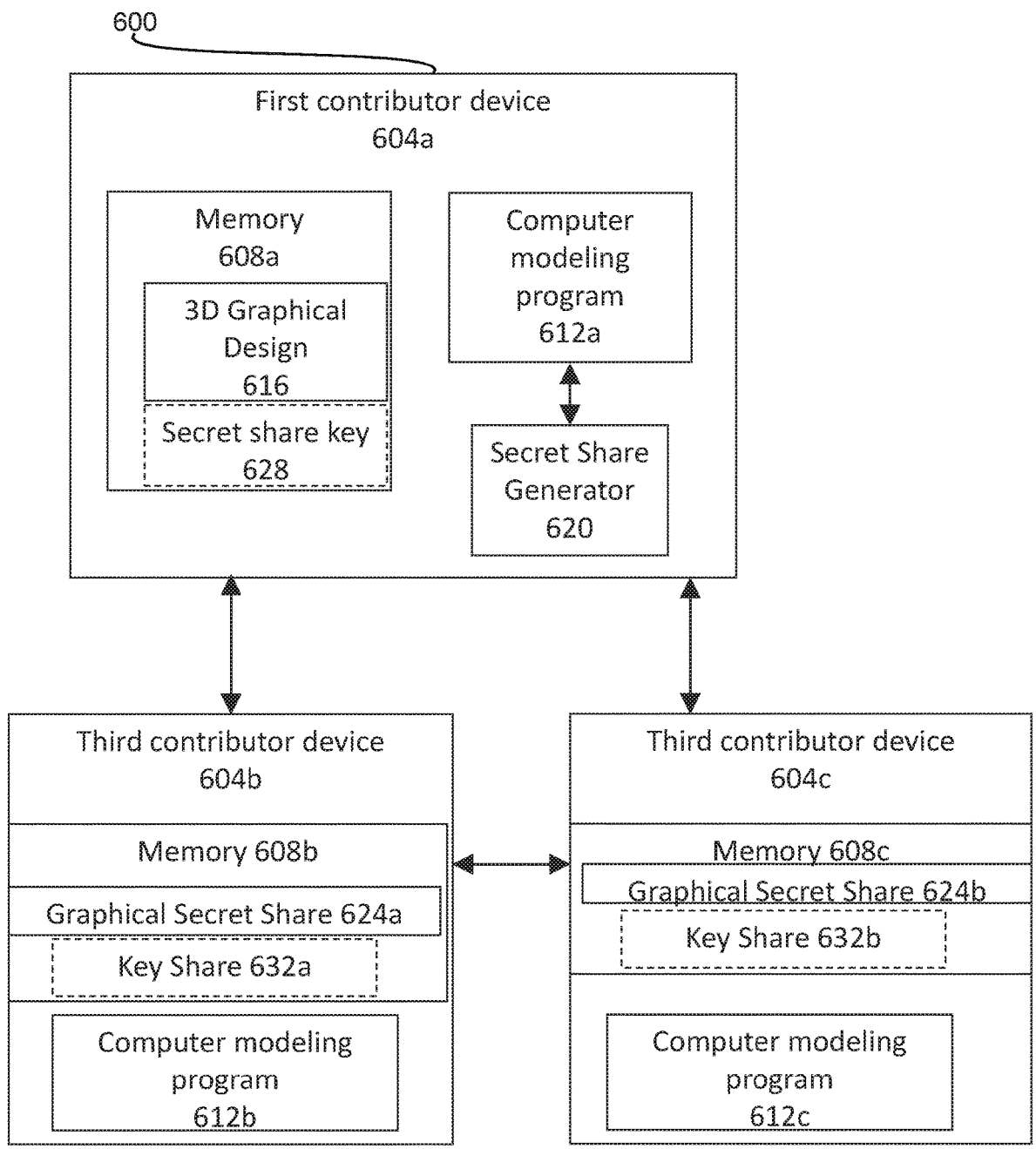
FIG. 6 is a block diagram illustrating an exemplary system for secure collaborative graphical design using secret sharing in an embodiment.

Turning now to FIG. 6, an alternate embodiment of a system 600 for secure collaborative graphical design using secret sharing is illustrated. System includes a first contributor device 604a of a plurality of contributor devices 604a-c. Each contributor device of plurality of contributor devices 604a-c may be any device suitable for use as secret owner device 104, at least a contributor device 132, or design owner device 140, as described above in connection with FIG. 1. Each contributor device of the plurality of contributor devices 604a-c has a memory 608a-c, which may be any memory 108 as described above in reference to FIG. 1. Each contributor device of the plurality of contributor devices has a computer modeling program 612a-c, which may be any computer modeling program as described above, including without limitation a CAD program, a CAM program, or the like. Each contributor device of the plurality of contributor devices 604a-c may have one or more of the modules, devices, or other components as described above operating on secret owner device 100, including without limitation data stores such as component data store 116 described above, interrogation engine 120, secret share generator 124, contributor interface 128, GUI 132, or merger engine 144.

System 600 includes a memory 608a in communication with first contributor device 604a. System includes a three-dimensional graphical design 616 stored in memory 608a of first contributor device 604a; three-dimensional graphical design 616 may be any three-dimensional graphical design 212 as described above in reference to FIG. 2. System 600 includes a computer modeling program 612a operating on first contributor device 604a. Computer modeling program 612a may include functionality to perform tasks performed by interrogator engine 120 as described above in reference to FIG. 1. Computer modeling program 612a may include functionality to perform tasks performed by merger engine 144 as described above in reference to FIG. 1.

System 600 includes a secret share generator 620 executing on first contributor device 604a; secret share generator 620 may be any secret share generator 124 as described above in reference to FIG. 1. Secret share generator 620 is configured to generate at least a graphical secret share 624a-b, which may be any at least a graphical secret share 300 as described above in reference to FIGS. 1 and 3A-D. Secret share generator 620 may be configured to generate a secret share key 628, which may be any secret share key 148 as described above in reference to FIG. 1. Secret share generator may be configured to receive secret share key 628 from another contributor device of plurality of contributor devices 604a-b.

Secret share generator 620 may be configured to generate a plurality of key shares 632a-b as a function of secret share key 148. Each key share of plurality of key shares 632a-b may be a datum that includes a portion of secret share key 148, but from which it is impossible or computationally impractical to generate secret share key 148 without at least one other key share of the plurality of key shares; at least one other key share of the plurality of key shares 632a-b may be the entire plurality of key shares, or may be a lesser quantity of key shares. In some embodiments, a set of key shares of plurality of key shares 632a-b having cardinality equal to a number of contributor graphical designs 400 needed to produce a combined graphical design 500 as described above in reference to FIGS. 1-5. Persons skilled in the art, upon reading this disclosure, will be aware of many secret sharing schemes whereby a plurality of key shares may be generated, including schemes that are information-theoretically secure (unbreakable given infinite computing resources) given one or more parametric assumptions, and schemes that are computationally secure (impossible to break in a practical time-scale given currently available computing resources, or theoretically available computing resources available over some future period of time); examples of such schemes include without limitation Shamir's secret sharing scheme based on using a set of n points (the secret shares) on an nth degree polynomial to uniquely define the polynomial (the secret) in a coordinate system, Blakely's secret sharing scheme based on using a set of n hyperplanes (the secret shares) in an n-dimensional space to find the unique intersection of all n hyperplanes (the secret), secret shares based on the Chinese remainder theorem, and secret shares in which n participants each receive one private key of an instance of a cryptographic system along with the secret as encrypted using all n instances.

In some embodiments, as further elucidated in the method discussion below, system 600 enables first contributor device 604*a* to distribute graphical secret shares 624*a-b* to a plurality of other contributor devices, such as second contributor device 604*b* and third contributor device 604*c*, permitting the each of the plurality of other contributor devices to generate a contributor graphical design, which may be at least a contributor graphical design 400 as described above in reference to FIGS. 1-5; although only two other contributor devices 604*b-c* are depicted in FIG. 6, it should be understood that system 600 may distribute greater numbers of graphical secret shares 624*a-b* to greater numbers of contributor devices 604*a-b*, as described in further detail below. Where system 600 distributes key shares 632*a-b*, a set of contributor devices 604*a-c* that are ultimately chosen to produce a final design may be able to combine key shares, and therefor use any computer modeling program 612*a-c* operating on any contributor device 604*a-c* to merge the graphical secret shares 624 to produce a combined graphical design, which may be performed as described above in reference to FIGS. 1-5. In an embodiment, this may eliminate the need for a central secret owner device; any contributor device 604*a-c* may operate as first contributor device 604*a* if configured as system 600, and different contributor devices of plurality of contributor devices 604*a-c* may operate as first contributor device 604*a* for another design. For instance, an overall design process may involve multiple stages, and each stage may be coordinated by a different contributor device; for some complex designs, a graphical secret share 624*a-b* may be used as a design in an additional iteration of a method as described below, to produce a contributor graphical design for the original collaborative design by the same collaborative design method. Persons skilled in the art will be aware of the ability to nest design stages recursively and produce multiple components and subsequently their assembly by way of multiple iterations of methods described herein.

System 600 also allows a contributor device 604*a-c* having a superior or optimal computer modeling program 612*a-c* for a particular merging task that might be performed by merge engine 144 to be the contributor device that performs that merging task. This may improve the efficiency of the merging task itself, and may also improve the efficiency or quality of an automated manufacturing process driven by manufacturing instructions derived from combined graphical design 500 by producing a more accurate combined graphical design 500 or producing combined graphical design 500 in a format capable of producing one or more manufacturing instruction sets more efficiently or effectively. Indeed, each contributor device given access to the ability to assemble graphical secret shares may separately perform merge with its computer modeling program, and subsequently generate optimal manufacturing instructions using its own version of combined graphical design 500; this may also ensure that each entity operating a contributor engine is able to use preferred and/or optimized manufacturing instruction sets, and manufacturing techniques to produce higher-quality or less expensive components or modifications for the structure being manufactured, without revealing any of those instruction sets, manufacturing techniques, or even modeling techniques, any of which may be proprietary, to any other entity operating one of the contributor devices 604*a-c*.

Figure 7:
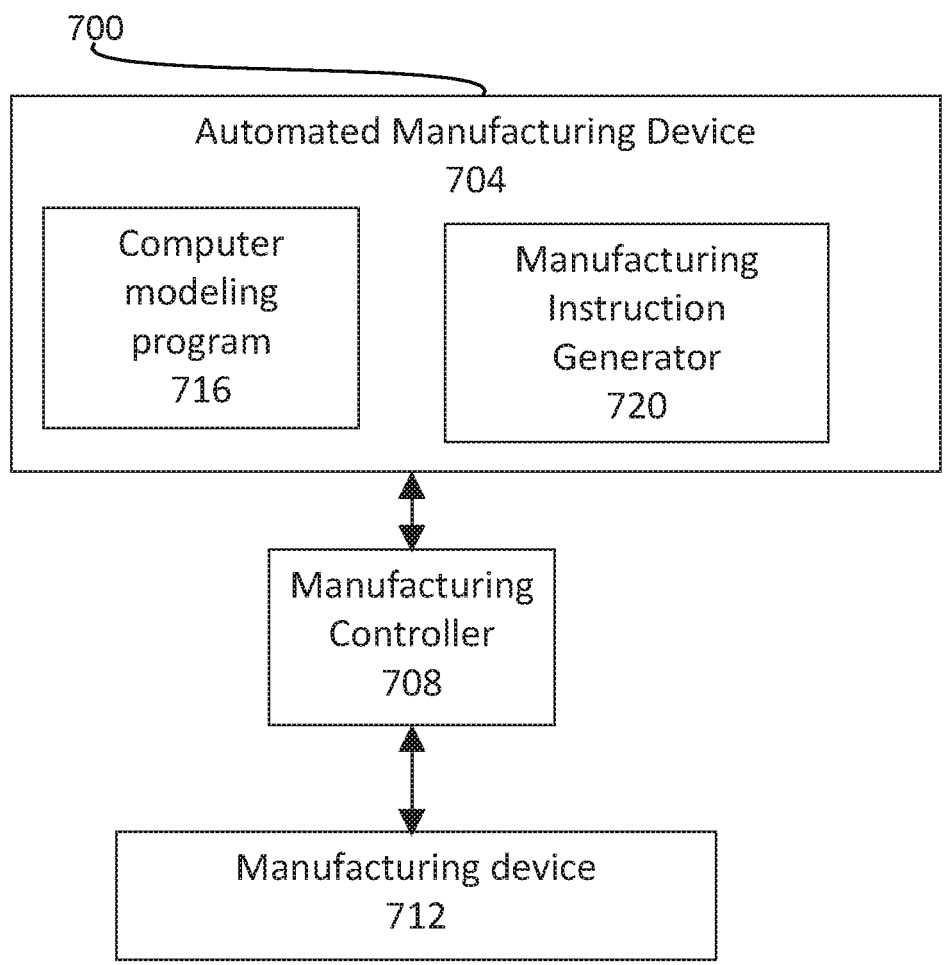
FIG. 7 is a block diagram illustrating an exemplary system for secure collaborative graphical design using secret sharing in an embodiment.

Referring now to FIG. 7, an exemplary embodiment of a manufacturing system 700 is illustrated. Manufacturing system 700 as used herein is a system that produces a physical article by manipulation of material. Manufacturing system 700 may produce the physical article through additive processes in which material is added to the article, including incremental additive processes such as rapid prototyping, stereolithography, "3D printing," and the like. Manufacturing system 700 may produce the physical article by subtractive processes including without limitation machining such as end-mill machining, EDM, and the like. Manufacturing system 700 may produce the physical article through molding processes. Manufacturing system 700 may produce the physical article through coating, painting, or other processes. Manufacturing system 700 may produce the physical article through assembly of components by fastening, welding, brazing, adhering, heat-sealing, and the like. Manufacturing system 700 may produce the physical article through sheet metal techniques such as bending, stamping, and punching sheet metal. Manufacturing system 700 may produce the physical article through textile or fiber product manipulation processes including filament production such as spinning, monofilament extrusion, pulp production, and the like, filament or fiber production methods such as twisting into cords, braiding, knitting, weaving, felting, pressing, rolling, and other methods, and methods for combining textile and/or fiber products with other such products or other items, including sewing, stapling, fastening, adhesion, layering, or other processes. Manufacturing system 700 may produce the physical article through methods and techniques for producing integrated circuits, semiconductors, printed circuit boards, and other electrical components. Manufacturing system 700 may produce the physical article through methods producing and manipulating polymers, including extrusion, frothing, foaming, cutting, and the like. Manufacturing system 700 may use any combination of the above methods, or of other manufacturing methods. Physical article may be a completed product, a partially completed product, a component of a product, or any other stage in the production process of any end-product from raw materials to the completed article.

Still viewing FIG. 7, manufacturing system 700 may include an automated manufacturing device 704. Automated manufacturing device 704 may be any computing device or combination of computing devices incorporated in manufacturing system 700 and designed and configured to initiate manufacture of a physical article. In an embodiment, a computing device may be incorporated in manufacturing system 700 where manufacturing device is able to transmit one or more instructions to manufacturing system 700 electronically, including by transmitting one or more instructions to another automated manufacturing device 704 incorporated in manufacturing system 700, to a manufacturing controller 708 as described in further detail below, or to a manufacturing device 712 as described in further detail below.

Still viewing FIG. 7, automated manufacturing device may include a computer modeling program 716; computer modeling program 716 may be any program suitable for use as a computer modeling program as described above in reference to FIGS. 1-6. Automated manufacturing device 704 may include a manufacturing instruction generator 720. Manufacturing instruction generator 720 may be a hardware or software module connected or operating on automated manufacturing device 704 and designed and configured to generate one or more manufacturing instructions that cause a manufacturing device 712, as described in further detail below, to perform at least one physical act to produce a physical article. Manufacturing instructions may include, without limitation, machine-control instructions or toolpaths for the operation of a subtractive manufacturing device such as a computer numerical control (CNC) machining device, rapid prototyping instructions directing a rapid prototyping device such as a 3D printer to add material incrementally in a particular pattern such as a layer in a 3D printed article, instructions to perform a step in a molding process such as assembling a mold, injection of material into a mold, increasing or decreasing temperature, curing, and opening the mold, and instructions to perform a particular assembly step, such as placement of an article relative to another article, attachment of screws or bolts, weld or adhesive placement, or any other manufacturing step.

Automated manufacturing device 704 may include, without limitation, any computing device or collection of computing devices described above. Secret owner device 104 may be an automated manufacturing device. At least a contributor device 132 may be an automated manufacturing device. Design owner device 140 may be an automated manufacturing device. Any one of contributor devices 604*a-c* may be an automated manufacturing device.

Manufacturing system 700 may include a manufacturing device 712. Manufacturing device 712 may be any device that performs manipulation of physical material to produce a physical article as described above. For example, and without limitation, manufacturing device 712 may be a machine tool or other subtractive manufacturing device, a rapid prototyping device, an automated assembly system such as one or more assembly robots, and any device capable of performing any other step in manufacturing processes as described above.

Figure 8:
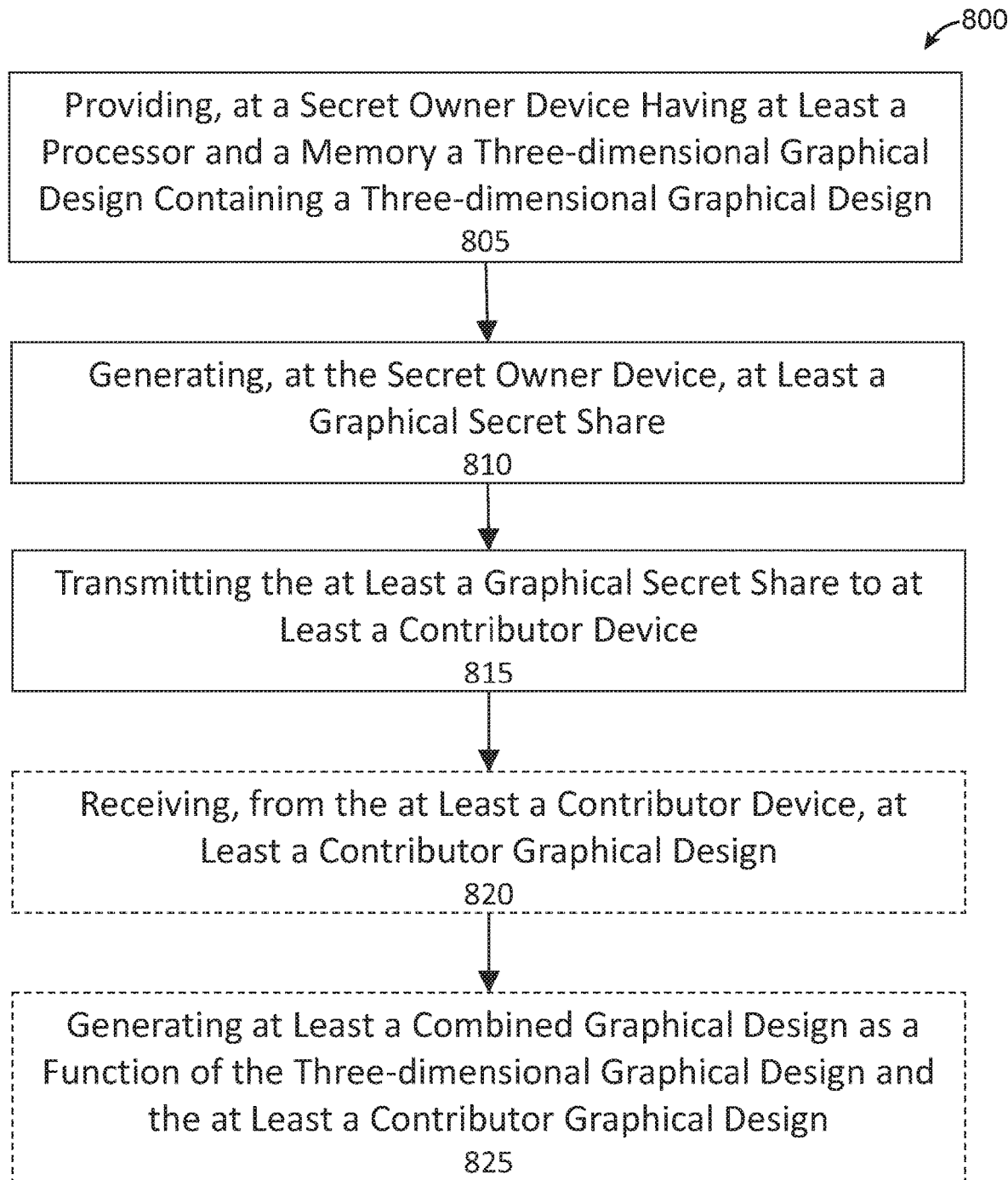
FIG. 8 is a flow diagram illustrating an exemplary method of secret-sharing for secure collaborative graphical design in an embodiment.

Turning now to FIG. 8, an exemplary embodiment of a method 800 of secret-sharing for secure collaborative graphical design is illustrated. At step 805, method 800 includes providing, at a secret owner device having at least a processor and a memory a three-dimensional graphical design containing a three-dimensional graphical design. At step 810, method 800 includes generating, at the secret owner device, at least a graphical secret share. At step 815, method 800 includes transmitting the at least a graphical secret share to at least a contributor device. At optional step 820, method includes receiving, from the contributor device, at least a contributor graphical design. At optional step 825, method 800 includes generating at least a combined graphical design as a function of the three-dimensional graphical design and the at least a contributor graphical design.

Still referring to FIG. 8, a three-dimensional graphical design 112 is provided at a secret share owner device 104. Three-dimensional graphical design 112 may be any three-dimensional graphical design 112 as described above in reference to FIG. 1. Three-dimensional graphical design 112 includes a first three-dimensional form 200. First three-dimensional form 200 includes a first three-dimensional shape 204. First three-dimensional form 200 includes a first dimension set 208 in three dimensions. Three-dimensional graphical design 112 includes at least a local geometric feature. First three-dimensional graphical design 112 may represent a physical article to be manufactured, including without limitation any physical article to be manufactured using manufacturing system 700 as described above.

In an embodiment, and still referring to FIG. 8, three-dimensional graphical design 112 may be any three-dimensional graphical design 616 as described above in reference to FIG. 6. Secret share owner device 104 may be a secret share owner device as disclosed above in reference to FIG. 1. Secret share owner device 104 may be a first contributor device 604*a* as described above in reference to FIG. 6. Secret share owner device 104 may generate three-dimensional graphical design 112 using a computer modeling program as described above. Computer modeling program may generate some geometrical features of three-dimensional graphical design 112 automatedly, for instance as described above in reference to FIGS. 1-6. Computer modeling program may generate some geometrical features of three-dimensional graphical design 112 in response to one or more user inputs. Computer modeling program may generate three-dimensional graphical design 112 using a combination of automated processes and user inputs. Secret owner device 104 may generate three-dimensional graphical design 112 using any method or system disclosed herein, including without limitation the method described in reference to FIG. 8, the system described in reference to FIG. 1, and the system described in reference to FIG. 6.

Still viewing FIG. 8, secret owner device 104 may receive three-dimensional design 112 from another device. For example, and without limitation, secret owner device 104 may receive three-dimensional design 112 from a contributor device of at least a contributor device 132, from a contributor device of plurality of contributor devices 604*a-b*, from design owner device 140, from automated manufacturing device 704, or any other computing device.

Figure 9A:
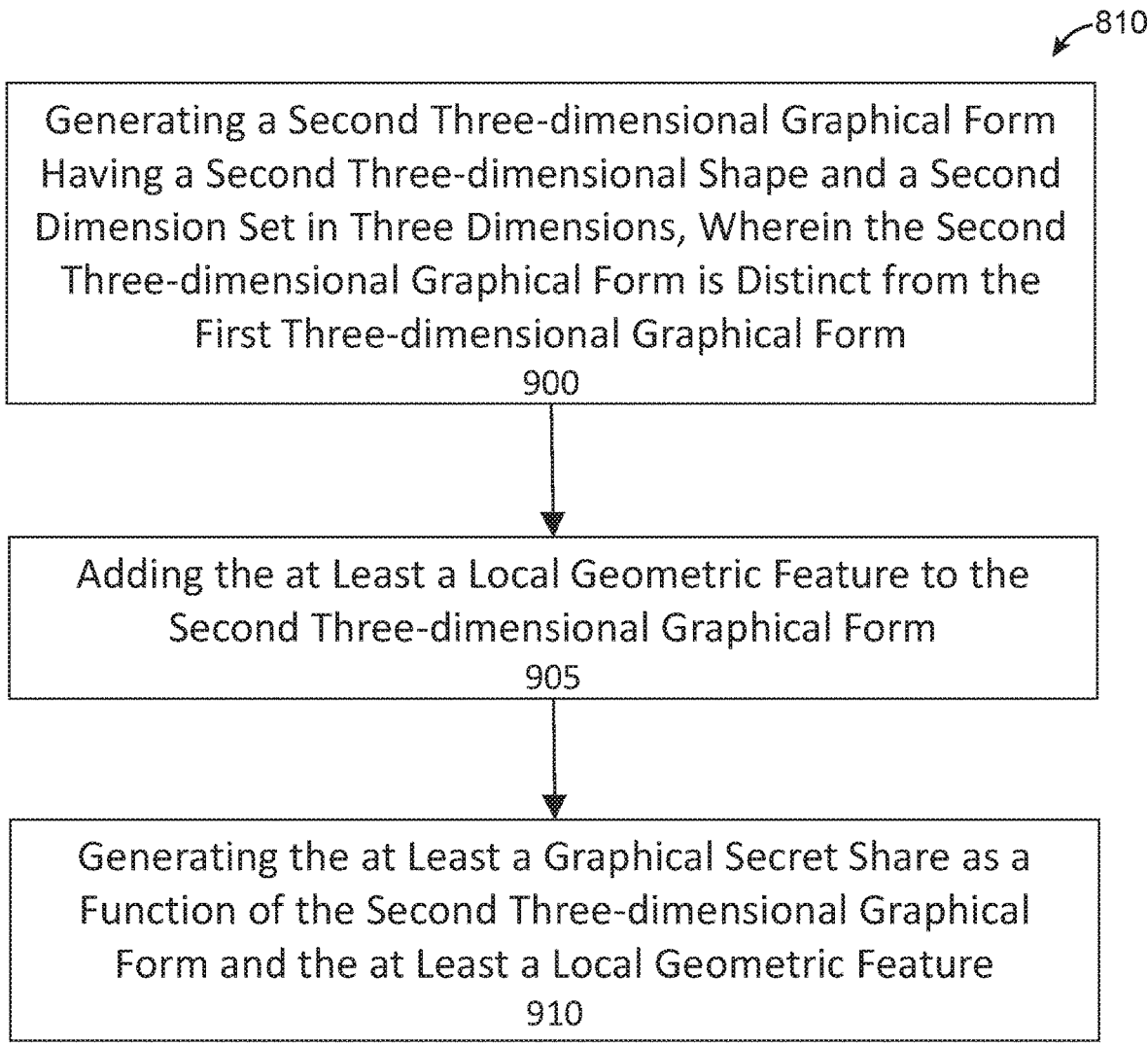
FIG. 9A is a flow diagram illustrating an exemplary method of generating a graphical secret share in an embodiment.

Continuing to view FIG. 8, at least a graphical secret share 300 is generated at the secret owner device 104. At least a graphical secret share 300 may be any at least a graphical secret share 300 or at least a graphical secret share 624*a-b* as described above in reference to FIGS. 1-6. At least a graphical secret share 300 may be generated by secret share generator 124 or secret share generator 620. FIG. 9A illustrates an exemplary embodiment of a method for generating at least a graphical secret share 300. At step 900, generating at least a graphical secret share 300 may include generating a second three-dimensional graphical form 304 having a second three-dimensional shape 308 and a second dimension set 312 in three dimensions. Further continuing step 900, the second three-dimensional graphical form 304 may be distinct from the first three-dimensional graphical form 200. Second three-dimensional graphical form 304 may be distinct from the first three-dimensional graphical form 200 where first three-dimensional shape 204 differs from second three-dimensional shape 308. Second three-dimensional graphical form 304 may be distinct from the first three-dimensional graphical form 200 where first dimension set 208 differs from second dimension set 312. There may be a combination of differences between first three-dimensional shape 204 and second three-dimensional shape 308 and differences between first three-dimensional graphical form 200 where first dimension set 208 differs from second dimension set 312.

Still referring to FIG. 9A, generating the second three-dimensional graphical form 304 may involve generating at least a three-dimensional geometric primitive. At least a three-dimensional geometric primitive may be a regular or irregular polyhedral solid, a regular or irregular curved solid, or some combination of polyhedral and curved elements.

Secret owner device 104 may determine whether second three-dimensional graphical form 304 differs from first three-dimensional graphical form 200 by comparing the geometric primitive to the first three-dimensional form and enumerating differences between the at least a three-dimensional geometric primitive and the first three-dimensional form 200 to produce at least a numerical quantity indicating a degree of difference. This may be accomplished, as a non-limiting example, by determining numbers of edges, vertices, and surfaces of each of the at least a three-dimensional geometric primitive and the first three-dimensional form, as well as rules or mathematical formulas relating edges, vertices, and surfaces to each other in each form; the edges, vertices, surfaces, and relational rules or mathematical formulas from each form may then be compared to the other. This may be performed by interrogator engine 120. Interrogator engine 120 may extract geometry from each form and enumerate differences between each set of geometry and the other. In some embodiments, the enumeration of differences is compared to a threshold number representing a minimum required number of differences. In some embodiments, secret owner device 104 determines that the numerical quantity indicating the degree of difference does not meet the threshold number and modifies the three-dimensional geometric primitive. Modification may include, without limitation, generating a different geometric primitive and combining it with the first geometric primitive or replacing the first geometric primitive or making a random change. Secret owner device 104 may enumerate differences between second three-dimensional graphical form 304 and first three-dimensional graphical form 200 and compare the enumeration to the threshold number. Second three-dimensional graphical form 304 may also be generated by retrieving one or more representations of components, for instance from component data store, and combining the one or more representations of components.

Still viewing FIG. 9A, generating the at least a graphical secret share 300 may involve generating at least a dummy feature 316 not included in the three-dimensional graphical design. This may be accomplished as described above in reference to FIGS. 1-5. At least a dummy feature 316 may be a duplicate of the at least a geometric feature. Generating the at least a dummy feature 316 may include retrieving, from a data store containing a plurality of geometric features, at least a stored feature that is distinct from the at least a geometric feature and generating the at least a dummy feature as a function of the at least a stored feature. For instance, the data store may be component data store 116, and at least a stored feature may be a component or geometry stored in data store 116. Interrogation engine 120 may verify that at least a dummy feature may be combined with other features of at least a graphical secret share 300 in a realistic or believable manner using manufacturing feasibility testing or similar methods.

Continuing to refer to FIG. 9A, generating the at least a graphical secret share 300 may involve adding dummy features in quantities that are a function of the number of geometric figures in three-dimensional graphical design 112. For instance, interrogator 120 may enumerate geometric features of three-dimensional graphical design 112; the enumeration may exclude the local geometric feature of at least a local geometric feature 212. Secret share generator 124 may then produce at least a graphical secret share 300 by iteratively building the at least a graphical secret share 300 using dummy features 316 assembled in a physically feasible manner to produce a graphical secret share having an equal quantity of information to the original design.

Still referring to FIG. 9A, at step 905, the at least a local geometric feature 212 is added to the second three-dimensional graphical form 304. This may be performed using a computer modeling program as described above. At step 910, the at least a graphical secret share 300 is generated as a function of the second three-dimensional graphical form 304 and the at least a local geometric feature 212.

Figure 9B:
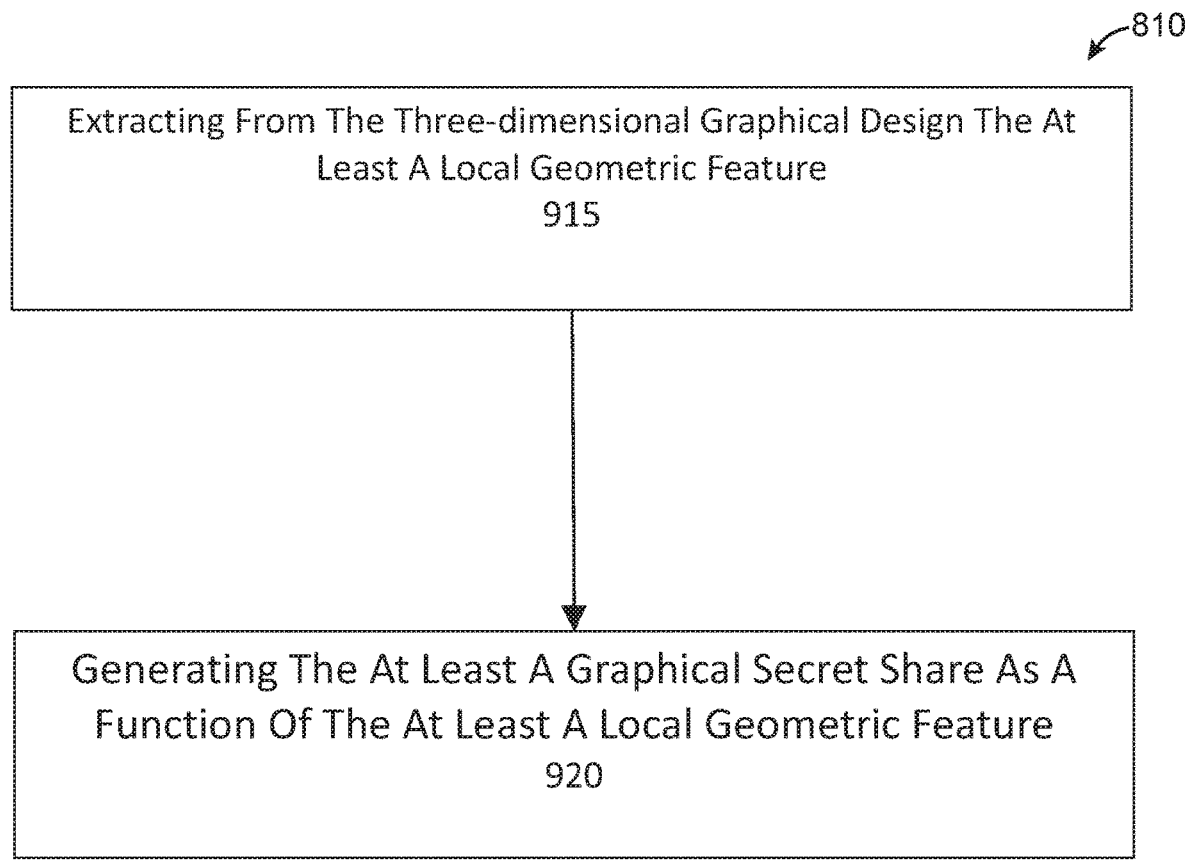
FIG. 9B is a flow diagram illustrating an exemplary method of generating a graphical secret share in an embodiment.

FIG. 9B illustrates another exemplary embodiment of a set of steps that may be followed to generate at least a graphical secret share 300. At step 915, at least a local geometric feature 212 is extracted from three-dimensional graphical design 112. This may be accomplished using interrogation engine 120. At step 920, at least a graphical secret share 300 is generated as a function of the at least a local geometric feature 212.

Returning to FIG. 8, where the three-dimensional graphical design contains at least a global constraint 216, generating the graphical secret share may include generating at least a secret share constraint as a function of the at least a global constraint 216. At least a global constraint may be any global constraint 216 described above in reference to FIGS. 1-6. At least a global constraint 216 may be entered by user; for instance, user may enter as at least a global constraint 216 a requirement that combined graphical design 500 weigh less than a certain amount, possess other physical or material properties, or cost least than a certain price, as determined by the user from manufacturing requirements the user wishes to fulfill, or physical limits user is aware of such as a minimum possible weight for design. Where three-dimensional graphical design 112 is a graphical secret share 300 produced in an earlier iteration of a collaborative editing method such as method 800, at least a global constraint 216 may be at least a secret share constraint 320 that was generated for that graphical secret share 300 during the earlier iteration. Interrogator engine 120 may also generate global constraint based upon, as a non-limiting example, known properties of materials or shapes represented in three-dimensional graphical design 112 or outputs of pricing methods.

Still viewing FIG. 8, at least a secret share constraint 320 may be generated from at least a global constraint 216 using one or more relationships between limitations or requirements affecting three-dimensional graphic design 112 and at least a secret share. Such limitations or requirements may be stored in a data store, derived or used by interrogator engine 120, entered by a user, received from another device, or otherwise obtained. As a non-limiting example, where a global constraint requires that an object represented in combined graphical design 500 may not exceed a certain mass or weight, a corresponding secret share constraint may require that the weight or mass of local geometric feature 212 with modifications as described above may not exceed certain amount. As another non-limiting example where a global constraint establishes that an object represented in combined graphical design 500 will exceed a certain weight (i.e. because some components are only available at or above a certain weight), a corresponding secret share constraint may be that a fastener or joining method added in a contributor graphical design 400 must have certain shear resistance or strength.

Continuing to view FIG. 8, where a global constraint is an expected degree of vibration, heat, impact, or other factor affecting durability of overall design, a corresponding secret share imposed for instance on a component to be added in contributor graphical design 400 may limit or require some degree of component ability to withstand the component's likely portion of that factor or component ability to alleviate the factor by, e.g. dampening vibration having the flexibility to absorb some degree of impact/force, having the ability to conduct electricity or heat away from the structure represented in combined three-dimensional graphical design, or the like.

Still viewing FIG. 8, where a global constraint is price-based, for instance as a maximum manufacturing price not to exceed, a corresponding secret share constraint may limit the contribution of modifications presented in contributor graphical design 400 to the price of the overall structure to be manufactured. In some embodiments, interrogation engine 120 may evaluate the price of the overall design, as well as the prices of individually contributed components; rules for interrogation engine may place non-price constraints on secret shares based on a known effect of, for instance, a particular geometric form, material, or other factor on the overall price. In addition, costing constraints may include a balance of manufacturing and maintenance costs, so that the constraints provided may be a mixture of constraints pertaining to durability and constraints pertaining to price: an aluminum stud may be given the same value as a steel stud that costs twice as much, for instance, based on the likelihood that the steel stud will last substantially longer.

Continuing to view FIG. 8, where a single geometric feature 212 of which there are a plurality in three-dimensional graphical design 300 is provided in a graphical secret share, secret share constraint may be based on a needed property of the plurality, and thus the secret share constraint may be a constraint on the individual contribution to that property of the single shared local geometric feature. Where each dummy feature 316 is affected by a similar secret share constraint, the actual constraint pertaining to the real features may be multiplied by the number of similar dummy features; similarly, at least a secret share constraint 320 may be a combination of secret share constraints imposed on real features and on dummy features.

In an embodiment, and with continuing reference to FIG. 8, at least a global constraint 216 may include a plurality of global constraints; for instance at least a global constraint may include a first global constraint and a second global constraint. Generating at least a secret share constraint 320 may include generating a single secret share constraint as a function of both first global constraint and second global constraint; for instance, a secret share constraint may corresponding to a first global constraint and a second global constraint that may be related mathematically may be expressed as a limitation on that mathematical relation. Generating the at least a secret share constraint may involve generating a first secret share constraint as a function of first global constraint and generating a second secret share constraint as a function of second global constraint.

Still referring to FIG. 8, generating at least a secret share 300 may involve generating a secret share key 148. Secret share key 148 may be generated as described above by reverence to an enumeration of features in all secret shares of at least a secret share 300. Generating at least a secret share 300 may involve generating a plurality of key shares, which may be generated according to any protocol described above in reference to FIGS. 1-6 for the generation and use of secret shares in secret sharing schemes. Key shares may be included in graphical secret shares of at least a graphical secret share 300 or transmitted separately to contributor devices 132.

Continuing to refer to FIG. 8, where at least a local geometric feature 212 includes a first geometric feature and a second geometric feature generating the at least a secret share 300 may include generating a first secret share containing the first geometric feature and the second three-dimensional graphical form 304, and generating a second secret share containing the second geometric feature and a third-three-dimensional graphical form; third three-dimensional graphical form may be generated using any process suitable for generation of second three-dimensional graphical form. Third three-dimensional graphical form is distinct from the first three-dimensional graphical form. Second three-dimensional graphical form may be distinct from third three-dimensional graphical form.

Still referring to FIG. 8, where generating the at least a secret share 300 includes generating first secret share and second secret share, generating the first graphical secret share may include generating a first secret share constraint as a function of the at least a global constraint, and generating the second graphical secret share may include generating a second secret share constraint as a function of the at least a global constraint. Each secret share constraint of first secret share constraint and second secret share constraint may be generated according to any process described above for generating at least a secret share constraint 320.

At step 815, and with continued reference to FIG. 8, method 800 includes transmitting the at least a graphical secret share to at least a contributor device 132. At least a contributor device may be any contributor device 132, 604*a-c* as described above in reference to FIGS. 1-6. Transmission may be accomplished using any form of electronic communication described above in reference to FIGS. 1-6. Transmission may be encrypted or otherwise secured, for instance using secure socket layer protocols.

With continued reference to FIG. 8, transmitting the at least a secret share 300 to at least a contributor device 132 may include transmitting a secret share of the at least a graphical secret share 300 to a plurality of contributor devices; the same secret share may be transmitted to multiple contributor devices 132 capable of making the same desired modification to a geometric feature of at least a local geometric feature 112. User-entered manufacturing requirements, at least a secret share constraint 320, and/or manufacturing requirements generated by interrogation engine 120 may be transmitted with or included in at least a graphical secret share 300. Where generating the at least a secret share 300 includes generating first secret share and second secret share, transmitting the at least a graphical secret share to the at least a contributor device may include transmitting the first graphical secret share to a first contributor device and transmitting the second graphical secret share to a second contributor device.

At optional step 820, and still referring to FIG. 8, method includes at least a contributor graphical design 400 may be received from the contributor device. Contributor graphical design 400 may be any contributor graphical design 400 as described above in reference to FIGS. 1-6. At least a contributor graphical design 400 may include at least a modification 404 to the at least a local geometric feature 212. Modification 404 may include an additional three-dimensional graphical form matching the local geometric feature, at least a modification to geometry 408, or at least an added component 412 as described above. Modification may include means of fastening, including crimping, welding, brazing, adhering, and the like, as described above in reference to FIGS. 1-6.

Still referring to FIG. 8, secret owner device 104 may compare the at least a contributor graphical design 400 to at least a secret share constraint 320. This may be accomplished by having interrogation engine 120 analyze contributor graphical design 400 for values or attributes with respect to which secret share constraint 320 is defined and determining whether those values or attributes fulfill the requirements of secret share constraint 320. Secret owner device 104 may compare at least a contributor graphical design 400 to at least a global constraint 216. This may be accomplished by having interrogation engine 120 analyze at least a contributor graphical design 400 for values or attributes with respect to which at least a global constraint 216 is defined and determining whether those values or attributes fulfill the requirements of at least a global constraint 216.

Where at least a global constraint includes a first global constraint and a second global constraint, secret owner device 104 may compare the at least a contributor graphical design 400 to the first global constraint and to the second global constraint.

Continuing to refer to FIG. 8, where at least a graphical secret share 300 includes a first secret share containing a first geometric feature and a second secret share containing a second geometric feature, secret owner device 104 may receive a first contributor graphical design including a modification to the first geometric feature, and may modify the second secret share constraint as a function of the contributor graphical design and the at least a global constraint. This may involve determining that the first contributor graphical design outperforms the first secret share constraint, and wherein modifying the second secret share constraint further comprises loosening the second secret share constraint; comparison of first contributor graphical design to the first secret share constraint may be performed as described above, for instance using interrogation engine 120. As a non-limiting example, where at least a global constraint 216 includes a maximum weight that the overall design cannot exceed, and a component submitted with first contributor graphical design weighs substantially less than the limit for that component given in first secret share constraint, second secret share constraint may be adjusted by the difference in weight to allow modifications in second contributor graphical design to weigh that much more. Similarly, if modifications in first contributor graphical design cost less than a maximum cost imposed by first secret share constraint, second secret share constraint may be modified to permit a higher cost for modifications provided in second contributor graphical design.

Still referring to FIG. 8, secret owner device 104 may determine that first contributor graphical design underperforms the first secret share constraint, and modifying the second secret share constraint further comprises tightening the second secret share constraint; as a non-limiting example, where first contributor graphical design weighs or costs more than first secret share constraint allows, second secret share constraint may be modified to allow less weight, or cost, than previously. Persons skilled in the art will be aware of many more variations on this process that may be performed along similar lines. Modified second secret share constraint may be transmitted to second contributor device; transmission may be accomplished according to any process described above for transmission of at least a secret share constraint 320.

At optional step 825, and still referring to FIG. 8, method 800 may include generating at least a combined graphical design 500 as a function of the three-dimensional graphical design 112 and the at least a contributor graphical design 400. This may be accomplished by merge engine 144, or by computer modeling program 612*a*-*c*, among other options. Where three-dimensional graphical design 112 includes at least a second feature not included in at least a graphical secret share 300, generating the at least a combined graphical design 500 may include modifying the at least a second feature as a function of at least a contributor graphical design 400; this may be done, for instance, where the at least a graphical secret share 300 included only one of several duplicate features as described above.

Still referring to FIG. 8, where generating at last a graphical secret share 300 further involves generating a first secret share constraint and a second secret share constraint as a function of the at least a global constraint 216, receiving the at least a contributor graphical design 400 may further involve receiving a first contributor graphical design matching the first secret share constraint and a second contributor graphical design matching the second secret share constraint. Generating at least a combined graphical design 500 may then include further comprises generating a first combined graphical design as a function of the three-dimensional graphical design and the first contributor graphical design and generating a second combined graphical design as a function of the three-dimensional graphical design and the second contributor graphical design. The first combined graphical design and second combined graphical design may each be displayed to a user, allowing the user to select a preferred design, for instance based on a greater willingness to compromise on one of the global constraints than the other.

Continuing to refer to FIG. 8, where multiple contributor graphical designs 400 are received for each desired modification, system 100 may generate combined graphical designs 500 representing each feasible combination, as determined for instance by interrogator engine 120, of contributor graphical designs 400, and display the combined graphical designs 500 for the user to select one. Combined graphical designs 500 may be ranked, for instance, combined graphical designs may be ranked according to degree of conformance with at least a global constraint 216.

With continued reference to FIG. 8, method 800 may include receiving, from a plurality of contributor devices 132, a plurality of contributor graphical designs 400, selecting, from the plurality of contributor graphical designs 400, a preferred contributor graphical design, and generating a combined graphical design as a function of the three-dimensional graphical design and the preferred contributor graphical design. Selecting may involve displaying plurality of contributor graphical designs to a user and receiving from the user a selection of the preferred contributor graphical design. Displaying plurality of contributor graphical designs to the user may further include ranking the plurality of contributor graphical designs and selecting a contributor graphical design, of the plurality of contributor graphical designs, having an optimal ranking. Ranking may be performed as function of the at least a global constraint 216.

Still referring to FIG. 8, as noted above, interrogation engine 120 test feasibility of combined graphical design 500. Merge engine 144 may receive an indication from interrogation engine 120 that one or more elements of combined graphical design 500 are infeasible; merge engine 144 may similarly receive a user input indicating that one or more elements of combined graphical design 500 are infeasible. Merge engine 144 transmit, or cause contributor interface 128 to transmit, to at least a contributor device 132 an indication that at least a graphical secret share 300 contains an infeasible modification. Secret owner device 104 may receive a second at least a contributor graphical design 400 that differs from first at least a contributor graphical design 400; this may be performed iteratively to generate a feasible design, either with user input or automatedly.

Still referring to FIG. 8, secret owner device 104 may initiate manufacture of a structure represented in combined graphical design. Initiating manufacture may involve commencing any manufacturing process that may be performed by a manufacturing system 700 as disclosed above in reference to FIG. 7. Initiating manufacture may include receiving, at an input port of secret owner device 104, a manufacture initiation signal. Initiating manufacture may include generating a manufacture guidance file, such as a design file as described above that may be used to direct a manufacturing device 712 as described above. Initiating manufacture may include generating manufacturing instructions as described above in reference to FIG. 7; manufacturing instructions may be generated by a manufacturing instruction generator 720 as described above. Initiating manufacture may include starting a manufacturing device 712; starting a manufacturing device may include transmitting manufacturing instructions to manufacturing device 712. Starting a manufacturing device 712 may include transmitting a design file to manufacturing device 712. Starting a manufacturing device 712 may include transmitting a signal to manufacturing device 712 that the manufacturing device 712 is configured to interpret as causing manufacturing device to perform physical operations as described above. Transmission may be direct, or via another automated manufacturing device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
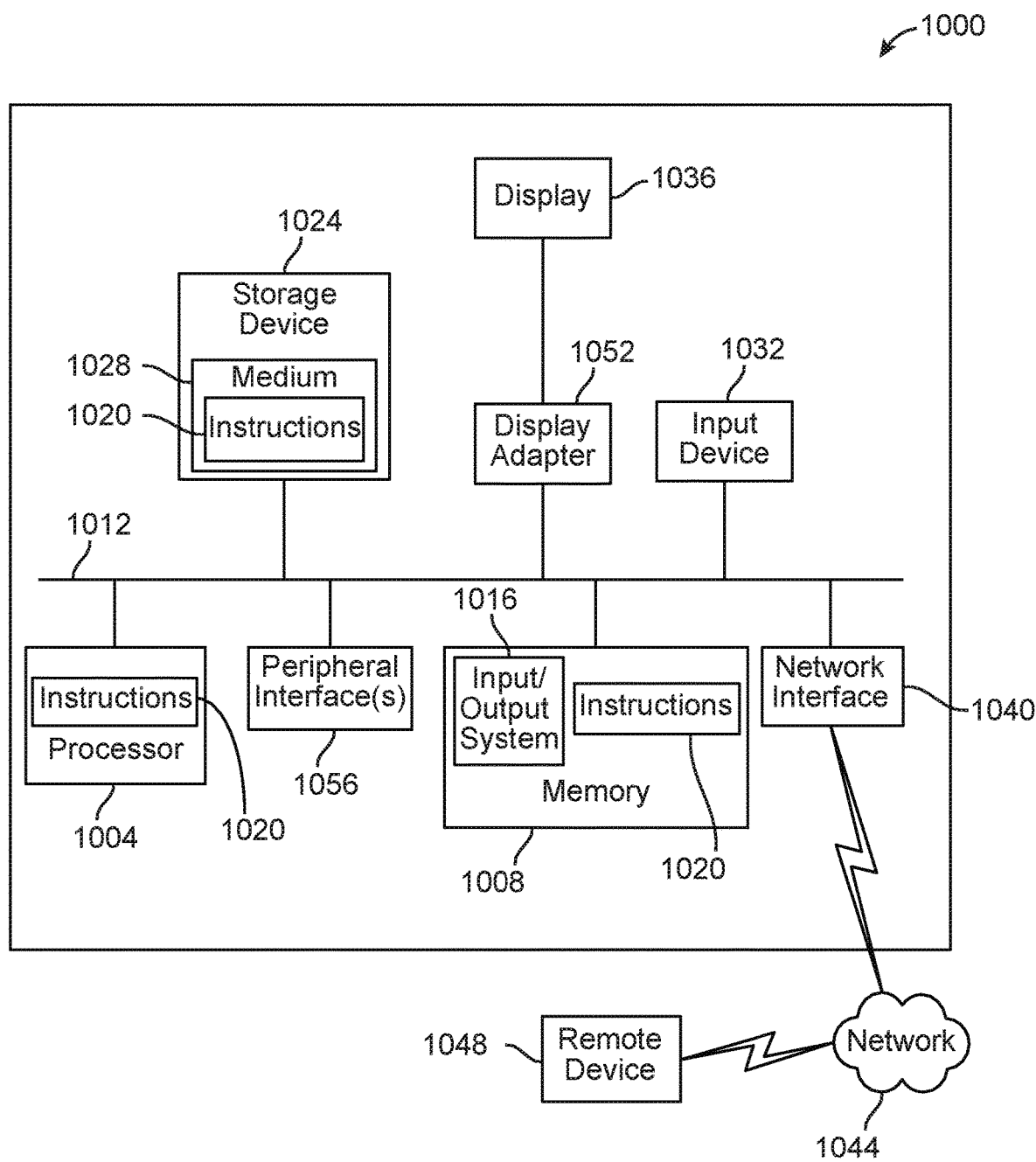
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system, for example the pricing system 200 of FIG. 2, or the product management system 250 of FIG. 2B, incorporating a pricing system, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

What is claimed is:

1. A system for secret sharing for secure collaborative graphical design, the system comprising a secret owner device having at least a processor and a memory, the secret owner device designed and configured to:
provide, at the secret owner device, a first three-dimensional graphical design, wherein the first three-dimensional graphical design includes:
a first three-dimensional form including a first three-dimensional shape and a first dimension set in three dimensions; and
a plurality of features including at least a local geometric feature;
generate at least a graphical secret share, wherein the graphical secret share is a graphical design that contains at least one feature of the first three-dimensional graphical design but lacks at least one other feature of the first three-dimensional graphical design, wherein generating the at least a graphical secret share further comprises:
generating a second three-dimensional graphical form having a second three-dimensional shape and a second dimension set in three dimensions, wherein the second three-dimensional graphical form is distinct from the first three-dimensional graphical form, wherein the second three-dimensional form comprises at least a dummy feature, wherein the at least a dummy feature is not a part of three-dimensional graphical design;
adding the at least a local geometric feature to the second three-dimensional graphical form; and
generating the at least a graphical secret share as a function of the second three-dimensional graphical form and the at least a local geometric feature; and
provide the at least a graphical secret share to at least a contributor device.

2. The system of claim 1, wherein the three-dimensional graphical design contains at least a global constraint, and wherein the secret owner device is further configured to generate the graphical secret share by generating at least a secret share constraint as a function of the at least a global constraint.

3. The system of claim 2, wherein the at least a global constraint includes at least a first global constraint and at least a second global constraint, and the secret owner device is configured to generate the at least a secret share constraint by generating a single secret share constraint as a function of both the first global constraint and the second global constraint.

4. The system of claim 2, wherein the at least a global constraint includes at least a first global constraint and at least a second global constraint, and the secret owner device is configured to generate the at least a secret share constraint by:
generating a first secret share constraint as a function of the first global constraint; and
generating a second secret share constraint as a function of the second global constraint.

5. The system of claim 2, wherein the secret share owner is further configured to:

receive, from the contributor device, at least a contributor graphical design, wherein the at least a contributor graphical design comprises a modification to the at least a local geometric feature; and generate at least a combined graphical design as a function of the three-dimensional graphical design and the at least a contributor graphical design.

6. The system of claim 5, wherein the secret owner device is further configured to compare the at least a contributor graphical design to the secret share constraint.

7. A method of secret sharing for secure collaborative graphical design, the method comprising:

providing, at a secret owner device having at least a processor and a memory, a first three-dimensional graphical design, wherein the first three-dimensional graphical design includes:
 a first three-dimensional form including a first three-dimensional shape and a first dimension set in three dimensions; and
 a plurality of features including at least a local geometric feature;

generating, at the secret owner device, at least a graphical secret share, wherein generating the at least a graphical secret share further comprises:
 generating a second three-dimensional graphical form having a second three-dimensional shape and a second dimension set in three dimensions, wherein the second three-dimensional graphical form is distinct from the first three-dimensional graphical form, wherein the second three-dimensional form comprises at least a dummy feature, wherein the at least a dummy feature is not a part of three-dimensional graphical design;
 adding the at least a local geometric feature to the second three-dimensional graphical form;
 generating the at least a graphical secret share as a function of the second three-dimensional graphical form and the at least a local geometric feature; and
 wherein the three-dimensional graphical design contains at least a global constraint, and wherein generating the graphical secret share further comprises generating at least a secret share constraint as a function of the at least a global constraint; and
transmitting the at least a graphical secret share to at least a contributor device.

8. The method of claim 7, wherein the graphical secret share is a graphical design that contains at least one feature of the first three-dimensional graphical design but lacks at least one other feature of the first three-dimensional graphical design.

9. The method of claim 7, wherein the at least a global constraint includes a first global constraint and a second global constraint.

10. The method of claim 9, wherein generating the at least a secret share constraint further comprises generating a single secret share constraint as a function of both the first global constraint and the second global constraint.

11. The method of claim 9, wherein generating the at least a secret share constraint further comprises:
 generating a first secret share constraint as a function of the first global constraint; and
 generating a second secret share constraint as a function of the second global constraint.

12. The method of claim 7, further comprising receiving, from the contributor device, at least a contributor graphical design, wherein the at least a contributor graphical design comprises a modification to the at least a local geometric feature.

13. The method of claim 12 wherein the modification further comprises an additional three-dimensional graphical form matching the local geometric feature.

14. The method of claim 12 further comprising comparing the at least a contributor graphical design to the secret share constraint.

15. The method of claim 12 further comprising comparing the at least a contributor graphical design to the global constraint.

16. The method of claim 12, wherein the at least a global constraint includes a first global constraint and a second global constraint, and further comprising comparing the at least a contributor graphical design to the first global constraint and to the second global constraint.

17. The method of claim 12 further comprising generating at least a combined graphical design as a function of the three-dimensional graphical design and the at least a contributor graphical design.

18. The method of claim 17 wherein the three-dimensional graphical design includes at least a second feature not included in the at least a graphical secret share, and wherein generating the at least a combined graphical design further comprises modifying the at least a second feature as a function of the at least a contributor graphical design.

19. The method of claim 17, wherein the three-dimensional graphical design contains at least a global constraint, and:
 wherein generating the at least a graphical secret share further comprises generating a first secret share constraint and a second secret share constraint as a function of the at least a global constraint;
 wherein receiving the at least a contributor graphical design further comprises receiving a first contributor graphical design matching the first secret share constraint and a second contributor graphical design matching the second secret share constraint; and
 wherein generating the at least a combined graphical design further comprises:
  generating a first combined graphical design as a function of the three-dimensional graphical design and the first contributor graphical design; and
  generating a second combined graphical design as a function of the three-dimensional graphical design and the second contributor graphical design.

20. A non-transitory machine-readable storage medium containing machine-executable instructions for performing a method of secret sharing for secure collaborative graphical design, the method comprising:

providing, at a secret owner device having at least a processor and a memory, a first three-dimensional graphical design, wherein the first three-dimensional graphical design includes:
 a first three-dimensional form including a first three-dimensional shape and a first dimension set in three dimensions; and
 a plurality of features including at least a local geometric feature;

generating, at the secret owner device, at least a graphical secret share, wherein generating the at least a graphical secret share further comprises:
 generating a second three-dimensional graphical form having a second three-dimensional shape and a second dimension set in three dimensions, wherein the second three-dimensional graphical form is distinct from the first three-dimensional graphical form, wherein the second three-dimensional form comprises at least a dummy feature, wherein the at least a dummy feature is not a part of three-dimensional graphical design;

adding the at least a local geometric feature to the second three-dimensional graphical form;

generating the at least a graphical secret share as a function of the second three-dimensional graphical form and the at least a local geometric feature; and wherein the three-dimensional graphical design contains at least a global constraint, and wherein generating the graphical secret share further comprises generating at least a secret share constraint as a function of the at least a global constraint; and transmitting the at least a graphical secret share to at least a contributor device.

* * * * *